United States Patent
Arimilli et al.

(10) Patent No.: US 9,766,890 B2
(45) Date of Patent: *Sep. 19, 2017

(54) NON-SERIALIZED PUSH INSTRUCTION FOR PUSHING A MESSAGE PAYLOAD FROM A SENDING THREAD TO A RECEIVING THREAD

(71) Applicant: INTERNATIONAL BUSINESS MACHINES CORPORATION, Armonk, NY (US)

(72) Inventors: Lakshminarayana B. Arimilli, Austin, TX (US); Bernard C. Drerup, Austin, TX (US); Guy L. Guthrie, Austin, TX (US); John D. Irish, Rochester, MN (US); William J. Starke, Rocnd Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 14/581,202

(22) Filed: Dec. 23, 2014

(65) Prior Publication Data

US 2016/0179517 A1 Jun. 23, 2016

(51) Int. Cl.
*G06F 9/312* (2006.01)
*G06F 9/30* (2006.01)
(Continued)

(52) U.S. Cl.
CPC .......... *G06F 9/3005* (2013.01); *G06F 9/3004* (2013.01); *G06F 9/546* (2013.01); *G06F 13/4022* (2013.01)

(58) Field of Classification Search
CPC .............................. G06F 9/3004; G06F 9/546
See application file for complete search history.

(56) References Cited

U.S. PATENT DOCUMENTS 6,308,220 B1 10/2001 Mathur
6,670,969 B1 12/2003 Halstead, Jr. et al.
(Continued)

OTHER PUBLICATIONS von Eicken, Thorsten et al., "Active Messages: a Mechanism for Integrated Communication and Computation", Proceedings of the 19th International Symposium on Computer Architecture, ACM Press, Gold Coast, Australia. May 1992.
(Continued)

*Primary Examiner* — Jacob A Petranek
(74) *Attorney, Agent, or Firm* — Brian F. Russell; Steven L. Bennett

(57) ABSTRACT

In at least some embodiments, a processor core executes a sending thread including a first push instruction and a second push instruction subsequent to the first push instruction in a program order. Each of the first and second push instructions requests that a respective message payload be pushed to a mailbox of a receiving thread. In response to executing the first and second push instructions, the processor core transmits respective first and second co-processor requests to a switch in the data processing system via an interconnect fabric of the data processing system. The processor core transmits the second co-processor request to the switch without regard to acceptance of the first co-processor request by the switch.

14 Claims, 16 Drawing Sheets

(51) Int. Cl.
G06F 13/40 (2006.01)
G06F 9/54 (2006.01)

(56) References Cited

U.S. PATENT DOCUMENTS

| | | | |
|---|---|---|---|
| 7,000,025 | B1 | 2/2006 | Wilson |
| 7,047,320 | B2 | 5/2006 | Arimilli et al. |
| 7,152,232 | B2 | 12/2006 | Chaudhry et al. |
| 8,429,661 | B1 | 4/2013 | Alfieri et al. |
| 8,499,302 | B2 | 7/2013 | Hass |
| 8,528,004 | B2 | 9/2013 | Archer et al. |
| 8,555,038 | B2 | 10/2013 | Olson et al. |
| 8,990,833 | B2 | 3/2015 | Kuesel et al. |
| 9,178,834 | B1* | 11/2015 | Chang .................... H04L 49/90 |
| 2003/0002503 | A1 | 1/2003 | Brewer et al. |
| 2006/0056405 | A1 | 3/2006 | Chang et al. |
| 2007/0124415 | A1 | 5/2007 | Lev-Ran et al. |
| 2008/0165777 | A1 | 7/2008 | Gainey et al. |
| 2008/0301708 | A1 | 12/2008 | Hamilton |
| 2009/0106495 | A1* | 4/2009 | Chou .................... G06F 9/3004 711/130 |
| 2010/0269027 | A1* | 10/2010 | Arimilli .................. G06F 9/542 714/799 |
| 2011/0274112 | A1 | 11/2011 | Czaszar et al. |
| 2012/0088527 | A1 | 4/2012 | Roka |
| 2012/0144395 | A1* | 6/2012 | Bohrer ..................... G06F 9/46 718/103 |
| 2012/0179736 | A1* | 7/2012 | Blocksome ............. G06F 9/546 709/201 |
| 2012/0291034 | A1* | 11/2012 | Kamath ................ G06F 9/4881 718/102 |
| 2012/0331184 | A1* | 12/2012 | Adar ....................... G06F 13/28 710/22 |
| 2013/0138930 | A1 | 5/2013 | Wilson |
| 2013/0151783 | A1* | 6/2013 | Ansaloni ............ G06F 12/0897 711/130 |
| 2013/0198480 | A1 | 8/2013 | Jones et al. |
| 2013/0304926 | A1 | 11/2013 | Mital et al. |
| 2013/0304990 | A1 | 11/2013 | Bass et al. |
| 2014/0095810 | A1* | 4/2014 | Loewenstein ..... G06F 17/30501 711/148 |
| 2015/0331720 | A1* | 11/2015 | Huetter .................. G06F 9/544 718/104 |

OTHER PUBLICATIONS

Herlihy, Maurice "The Aleph Toolkit: Support for Scalable Distributed Shared Objects", Brown University Providence RI 02912, Dec. 20, 2002.
Bracy, Anne et al., "Disintermediated Active Communication", IEEE Computer Architecture Letters, vol. 5, Nov. 9, 2006.
Pakin, Scott et al., "Fast Message (FM): Efficient, Portable Communication for Workstation Clusters and Massively-Parallel Processors", Department of Computer Science University of Illinois, Jan. 27, 1997.
Franke, H. et al., "Introduction to the wire-speed processor and architecture", IBM J. Res. & Dev. vol. 54 No. 1 Paper 3, Jan./Feb. 2010.
Stuart, Jeff A. et al., "Message passing on data-parallel architectures." Parallel & Distributed Processing, 2009. IEEE International Symposium on. IEEE, May 2009.
Skjellum, Anthony et al., "A thread taxonomy for MPI." In MPI Developer's Conference Proceedings., Second, IEEE Jul. 1996.
Wong, Kwan-Po et al., "Push-Pull Messaging: A High-Performance Communication Mechanism for Commodity SMP Clusters", Department of Computer Science and Information Systems, The University of Hong Kong, Feb. 8, 1999.
Tsai et al. "The Superthreaded Architecture: Thread Pipelining with Run-Time Data Dependence Checking and Control Speculation" IEEE, Proceedings of PACT 1996.
Morel, Matthieu "Components for Grid Computing", Version 1, Mar. 12, 2008.
Moir, Mark et al., "Concurrent Data Structures", Handbook of Data Structures and Applications, 2007.
Arimillit anl. "Hardware Assisted Interthread Push Communication", Filing Date: Dec. 22, 2014; U.S. Appl. No. 14/579,614 Notice of Allowance dated Nov. 20, 2015.
Arimilli et al. "Hardware-Assisted Interthread Push Communication", Filing Date: Jun. 8, 2015; U.S. Appl. No. 14/733,227 Notice of Allowance dated Mar. 1, 2016.
Arimilli et al. "Addressing for Interthread Push Communication", Filing Date: Dec. 22, 2014; U.S. Appl. No. 14/579,681 Final Office Action dated Jun. 20, 2016.
Arimilli et al. "Addressing for Interthread Push Communication", Filing Date: Dec. 22, 2014; U.S. Appl. No. 14/579,681 Non-Final Office Action dated Feb. 1, 2016.
Arimilli et al. "Addressing for Interthread Push Communication", Filing Date: Dec. 22, 2014; U.S. Appl. No. 14/579,681 Notice of Allowance dated Feb. 6, 2017.
Arimilli et al. "Addressing for Interthread Push Communication", Filing Date: Jun. 8, 2015; U.S. Appl. No. 14/733,331 Corrected Notice of Allowance dated Feb. 21, 2017.
Arimilli et al. "Addressing for Interthread Push Communication", Filing Date: Jun. 8, 2015; U.S. Appl. No. 14/733,331 Non-Final Office Action dated Apr. 7, 2016.
Arimilli et al. "Push Instruction for Pushing a Message Payload From a Sending Thread to a Receiving Thread", Filing Date: Dec. 23, 2014; U.S. Appl. No. 14/581,144 Notice of Allowance dated Oct. 06, 2016.
Arimilli et al. "Push Instruction for Pushing a Message Payload From a Sending Thread to a Receiving Thread", Filing Date: Jun. 8, 2015; U.S. Appl. No. 14/733,631 Non-Final Office Action dated May 26, 2016.
Arimilli et al. "Push Instruction for Pushing a Message Payload From a Sending Thread to a Receiving Thread", Filing Date: Jun. 8, 2015; U.S. Appl. No. 14/733,631 Notice of Allowance dated Oct. 5, 2016.
Arimilli et al. "Non-Serialized Push Instruction for Pushing a Message Payload From a Sending Thread to a Receiving Thread", Filing Date: Jun. 8, 2015; U.S. Appl. No. 14/733,496 Non-Final Office Action dated Jan. 10, 2017.
Arimilli et al. "Non-Serialized Push Instruction for Pushing a Message Payload From a Sending Thread to a Receiving Thread", Filing Date: Jun. 8, 2015; U.S. Appl. No. 14/733,496 Notice of Allowance dated May 30, 2017.

* cited by examiner

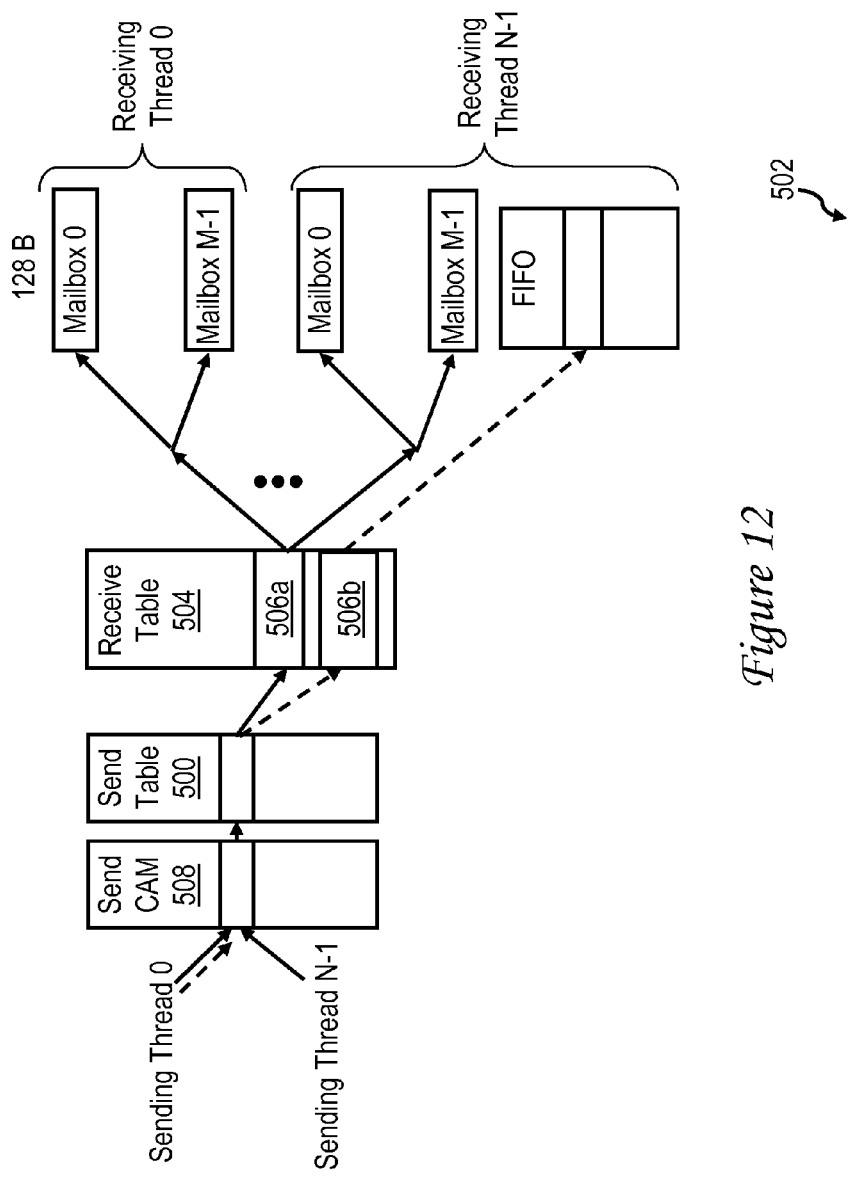

NON-SERIALIZED PUSH INSTRUCTION FOR PUSHING A MESSAGE PAYLOAD FROM A SENDING THREAD TO A RECEIVING THREAD

BACKGROUND OF THE INVENTION

The present invention relates generally to data processing and, in particular, to inter-thread communication within a multithreaded data processing environment.

In conventional symmetric multiprocessor (SMP) data processing environments, it is typical for programming to subdivide the various workloads into multiple (and possibly numerous) concurrent software threads of execution. Commonly, some software threads are generally employed to produce data and are therefore termed "producer threads," while others of the threads generally consume the data produced by the producer threads and are therefore termed "consumer threads." This division of labor between threads requires inter-thread communication in order to deliver the data produced by the producer threads to the consumer threads.

In conventional SMP data processing environments, such as that illustrated in FIG. 1, inter-thread communication is typically implemented utilizing a "yank-and-pull" methodology. According to this methodology, a producer thread 100 produces a value, represented in this example as cache line A, which is accessed and processed (i.e., consumed) by a (possibly remote) consumer thread 102. In the depicted processing scenario, the current value of cache line A resides at some initial time in the local memory (e.g., a cache) of consumer thread 102. In order to establish an updated value of cache line A, producer 100 "yanks" the value back to its local memory by acquiring a semaphore that grants permission to modify cache line A and by issuing, via a coherent communication network, a request 104a for the current value of cache line A. In response to request 104a, consumer 102 invalidates its copy of cache line A, and the value of cache line A is transmitted to producer 100 in a data tenure 106a.

In response to receipt of the current value of cache line A, producer thread 100 performs the processing necessary to produce an updated value of cache line A. At the conclusion of its processing, producer thread 100 executes a store operation to release the semaphore and a barrier operation to make the release of the semaphore visible to other threads, including consumer thread 102. While producer thread 100 is performing the processing necessary to produce the updated value of cache line A, consumer thread 102 executes a polling loop in which it seeks to acquire the semaphore. When the release of the semaphore by producer thread 100 becomes visible to consumer thread 102, consumer thread 102 exits the polling loop and "pulls" the updated value of cache line A to its local memory (e.g., cache) by issuing, via the coherent communication network, a request 104b for cache line A. In response to request 104b, the updated value of cache line A is transmitted to consumer thread 102 in data tenure 106b.

The present disclosure appreciates that the conventional yank-and-pull methodology for inter-thread communication depicted in FIG. 1 has a number of drawbacks. First, the yank-and-pull methodology has a relatively high latency due to the execution of both the "yank" and "pull" phases and a barrier operation. Second, the yank-and-pull methodology consumes significant data bandwidth of the coherent communication network due to the two movements of cache line A. Third, the polling employed by the consumer thread in the yank-and-pull methodology contributes to low processor efficiency and unproductive power dissipation. Fourth, the yank-and-pull methodology is limited to communication between threads executing within the same SMP system that both have access to a shared address space (e.g., threads within the same process or logical partition (LPAR)). Fifth, to ensure security, the yank-and-pull methodology requires an underlying operating system to establish appropriate page table settings to authorize communication between the producer thread 100 and consumer thread 102. Sixth, the yank-and-pull methodology is limited to one-to-one pairwise communication between threads and does not support one-to-many, many-to-one, or many-to-many thread communication.

BRIEF SUMMARY

In at least some embodiments, a processor core of a data processing system receives a push instruction of a sending thread that requests that a message payload identified by at least one operand of the push instruction be pushed to a mailbox of a receiving thread. In response to receiving the push instruction, the processor core executes the push instruction of the sending thread. In response to executing the push instruction, the processor core initiates transmission of the message payload to the mailbox of the receiving thread. In one embodiment, the processor core initiates transmission of the message payload by transmitting a co-processor request to a switch of the data processing system via an interconnect fabric.

In at least some embodiments, a processor core executes a sending thread including a first push instruction and a second push instruction subsequent to the first push instruction in a program order. Each of the first and second push instructions requests that a respective message payload be pushed to a mailbox of a receiving thread. In response to executing the first and second push instructions, the processor core transmits respective first and second co-processor requests to a switch in the data processing system via an interconnect fabric of the data processing system. The processor core transmits the second co-processor request to the switch without regard to acceptance of the first co-processor request by the switch.

In at least some embodiments, a switch of a data processing system receives a request to push a message referenced by an instruction of a sending thread to a receiving thread. In response to receiving the request, the switch determines whether the sending thread is authorized to push the message to the receiving thread by attempting to access an entry of a data structure of the switch utilizing a key derived from at least one identifier of the sending thread. In response to access to the entry being successful, content of the entry is utilized to determine an address of a mailbox of the receiving thread, and the switch pushes the message to the mailbox of the receiving thread. In response to access to the entry not being successful, the switch refrains from pushing the message to the mailbox of the receiving thread.

In at least some embodiments, a switch includes a receive data structure including receive entries each uniquely corresponding to a receive window, where each receive entry includes addressing information for one or more mailboxes into which messages can be injected, a send data structure including send entries each uniquely corresponding to a send window, where each send entry includes a receive window field that identifies one or more receive windows, and switch logic. The switch logic, responsive to a request to push a message to one or more receiving threads, accesses a send entry that corresponds to a send window of the sending thread, utilizes contents of the receive window field of the send entry to access one or more of the receive entries, and pushes the message to one or more mailboxes of one or more receiving threads utilizing the addressing information of the receive entry or entries.

BRIEF DESCRIPTION OF THE SEVERAL
VIEWS OF THE DRAWINGS

FIG. 12 depicts the data flow employed in N-to-N thread communication utilizing a hybrid addressing mode in accordance with one embodiment;

FIG. 13 illustrates an exemplary embodiment of a send table entry containing a routing information field supporting inter-thread communication between SMPs;

DETAILED DESCRIPTION

Figure 1:
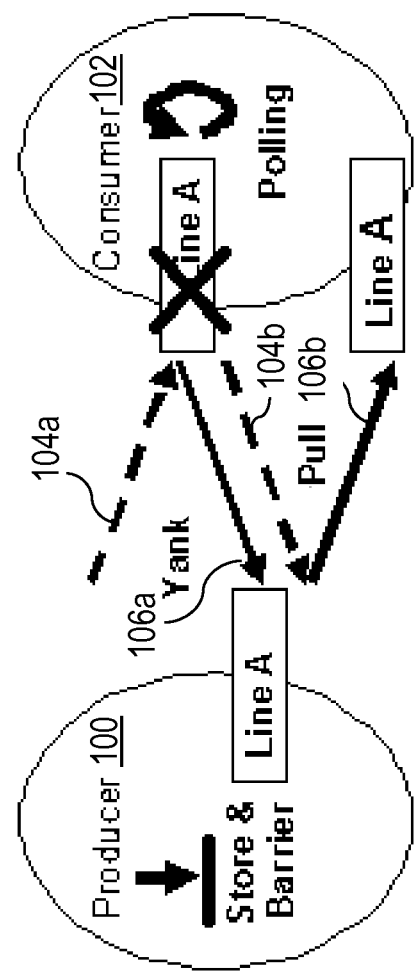
FIG. 1 is a high level block diagram of conventional "yank-and-pull" inter-thread communication in a prior art data processing environment.
Figure 2:
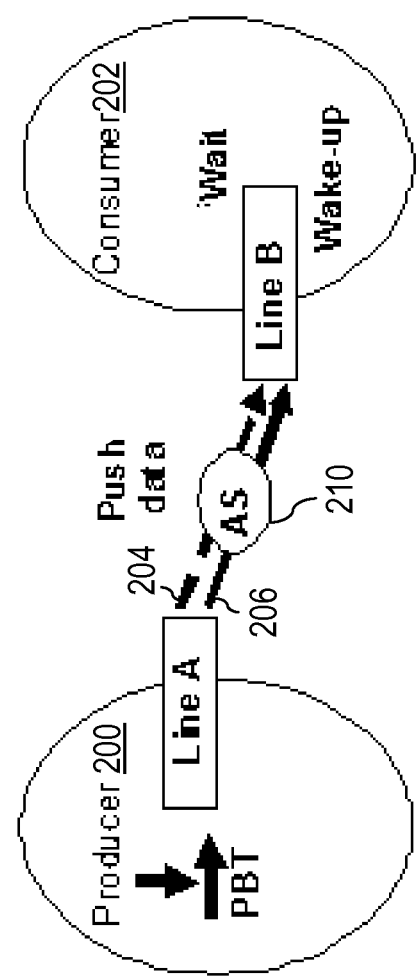
FIG. 2 is a high level block diagram of inter-thread push communication in accordance with one embodiment.

With reference again to the figures, wherein like reference numerals refer to like and corresponding parts throughout, and in particular with reference to FIG. 2, there is illustrated a high level block diagram of inter-thread push communication in accordance with one embodiment. In the illustrated example, a producer thread 200 executes a series of instructions to produce an updated value of a cache line A in its local memory (e.g., cache). Producer thread 200 then executes an instruction, referred to herein as a Push Block to Thread (PBT) instruction, to cause the updated value of cache line A to be pushed to the local memory (e.g., cache) of a consumer thread 202. In the illustrated example, the push operation, which includes both a request 204 and a data tenure 206, is preferably facilitated in hardware by an accelerator switch (AS) 210.

AS 210 installs the updated value of cache line A into the local memory of consumer thread 202. Rather than moving the updated value of cache line A to a corresponding address in the local memory of consumer thread 202, AS 210 installs the updated value of cache line A in cache line B, which is assigned a different effective address than cache line A. As shown, the installation of the updated value into cache line B wakes consumer thread 202 from a Wait (suspend) state, causing consumer thread 202 to process (i.e., consume) the value from cache line B.

As will be appreciated, inter-thread communication employing a push methodology as depicted in FIG. 2 yields many benefits, including lower latency execution than a conventional "yank-and-pull" methodology, the consumption of less data bandwidth on the system's communication network due to the use of one data move rather than two, improved core efficiency and reduced power dissipation for the processor core executing consumer thread 202, and the elimination of memory preparation overhead such as establishing page table settings and/or memory pinning. In addition, because effective rather than real addresses are employed, the push methodology shown in FIG. 2 enables messaging across different processes, different LPARs, and even different SMPs. Further, the push methodology for inter-thread communication shown in FIG. 2 can support one-to-many, many-to-one, and many-to-many thread communication.

Figure 3:
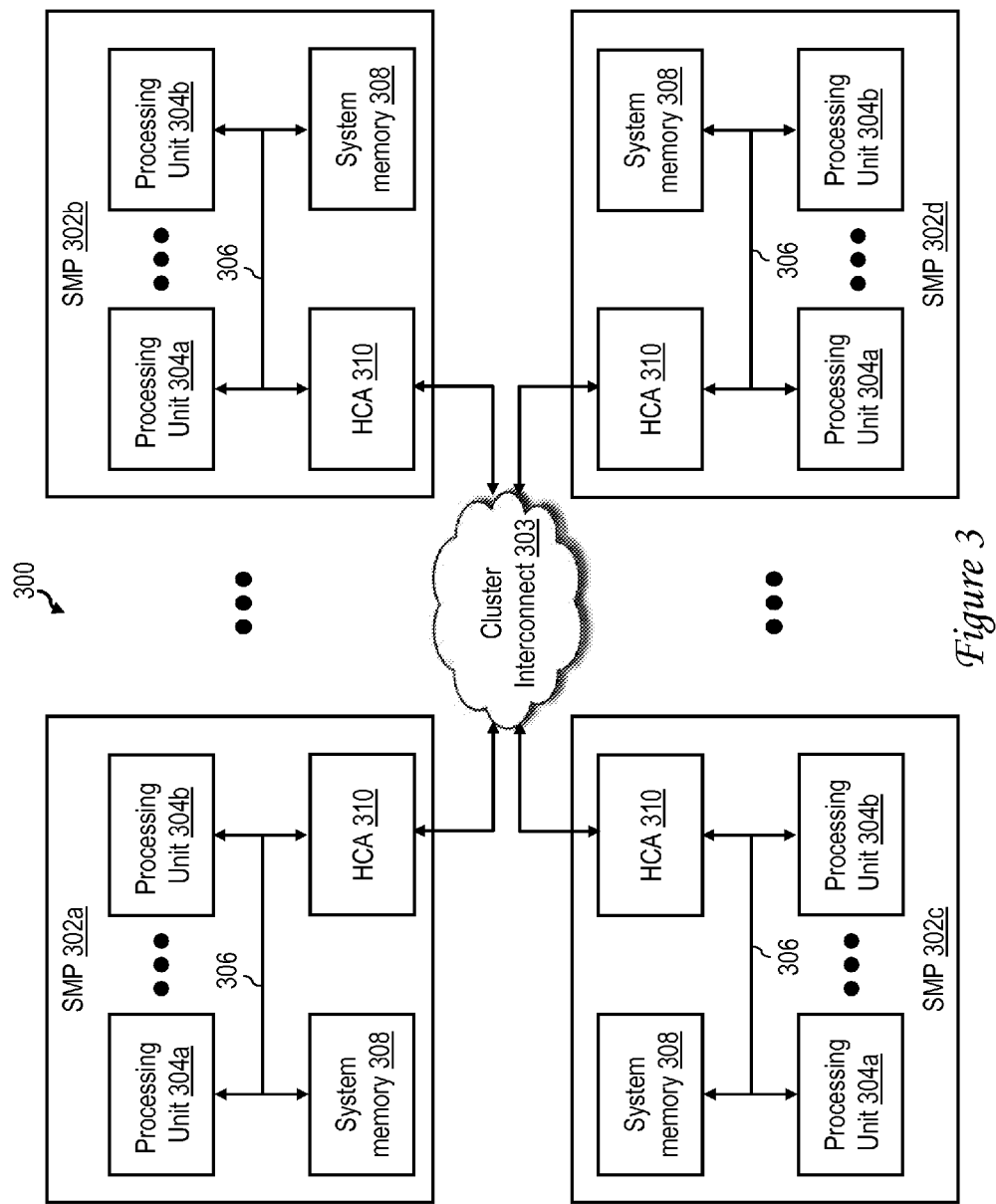
FIG. 3 is a high level block diagram illustrating an exemplary data processing environment employing inter-thread push communication in accordance with one embodiment.

With reference now to FIG. 3, there is illustrated a high level block diagram depicting an exemplary data processing environment 300 employing inter-thread push communication in accordance with one embodiment. In the depicted embodiment, data processing environment 300 includes a cluster of symmetric multiprocessor (SMP) data processing systems 302, which in this example include at least SMPs 302a-302d and in some embodiments may include numerous other SMPs 302. SMPs 302 are communicatively coupled by a cluster interconnect 303, which may include direct cabling and/or one or more wired or wireless, local or wide area interconnection networks, and may further include one or more additional SMPs 302 communicatively coupled between one or more of SMPs 302a-302d.

In the depicted embodiment, each SMP 302 includes a host channel adapter (HCA) 310 that serves as a communication interface by which the SMP 302 can communicate with other SMPs 302 via cluster interconnect 303. In addition, each SMP 302 includes multiple processing units 304 (including processing units 304a-304b) for processing data and instructions. Processing units 304 are coupled for communication with each other, with at least one system memory 308, and with a HCA 310 by a system interconnect 306. System interconnect 306, which conveys address, data and control information, may be implemented, for example, as a bused interconnect, a switched interconnect or a hybrid interconnect. Data and instructions residing in a system memory 308 can generally be accessed, cached and modified by any processing unit 304 within the same SMP 302.

The platform resources and operation of each SMP 302 is preferably managed by management software, such as a virtual machine monitor (VMM) or hypervisor. The management software may partition the physical resources (e.g., processing units 304, system memory 308, HCAs 310, etc.) available within its SMP 302 into multiple logical partitions, which execute under the direction of possibly heterogeneous operating systems. Each operating system may in turn support execution of one or more middleware or application software programs comprising a plurality of software threads.

Those skilled in the art will appreciate that data processing environment 300 of FIG. 3 can include many additional non-illustrated components, such as non-volatile storage, a cluster management console, etc. Because such additional components are not necessary for an understanding of the described embodiments, they are not illustrated in FIG. 3 or discussed further herein. It should also be understood, however, that the enhancements to inter-thread communication described herein are applicable to data processing systems of diverse architectures and are in no way limited to the generalized data processing system architecture illustrated in FIG. 3.

Figure 4:
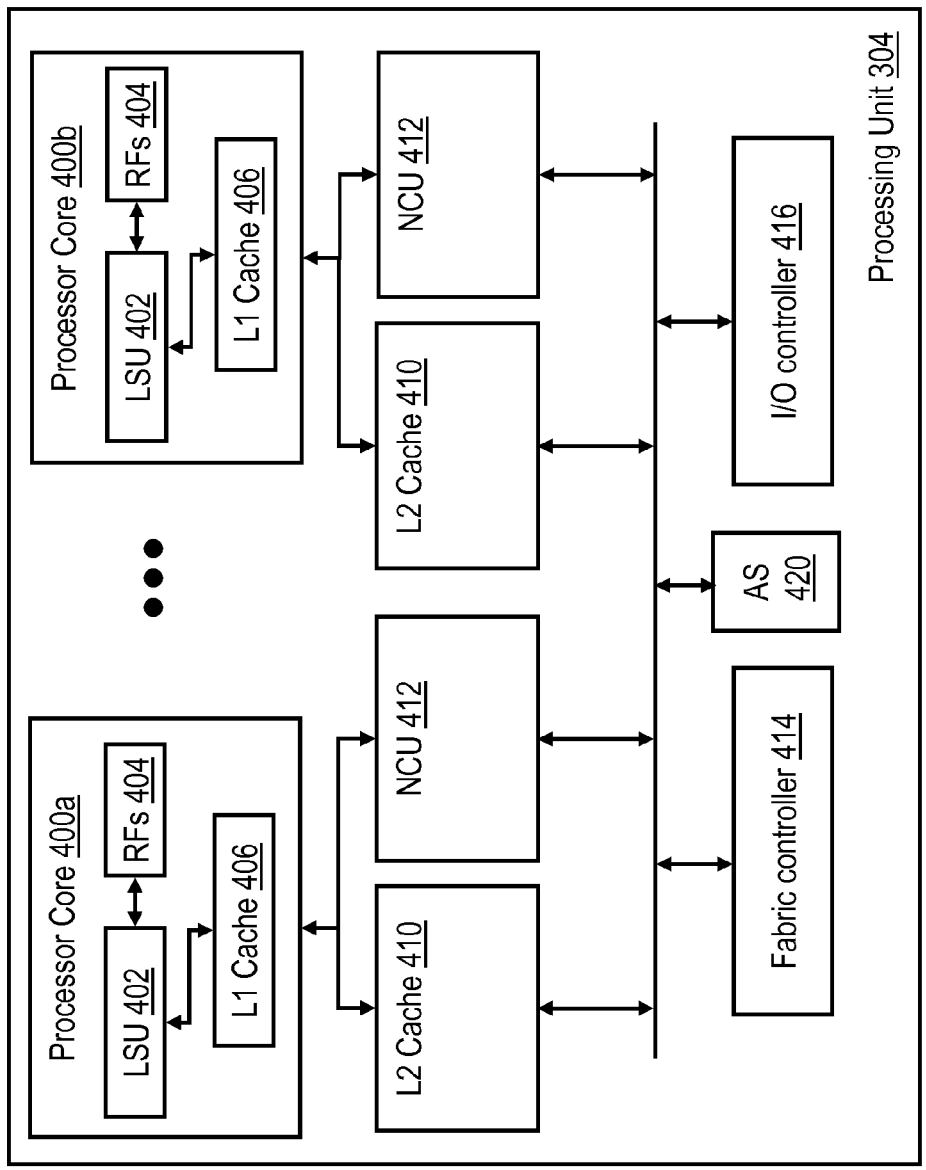
FIG. 4 is a more detailed block diagram of a processing unit in the data processing environment of FIG. 3.

Referring now to FIG. 4, there is depicted a more detailed block diagram of an exemplary processing unit 304 from FIG. 3 in accordance with one embodiment. In the depicted embodiment, each processing unit 304 is an integrated circuit including two or more processor cores 400 (including processor cores 400a-400b) for processing instructions and data. In some embodiments, each processor core 400 is capable of independently executing multiple simultaneous hardware threads of execution.

Each processor core 400 includes one or more execution units, such as load-store unit (LSU) 402, for executing instructions. The instructions by LSUs 402 include memory access instructions that request load or store access to one or more memory blocks in an addressable effective address space or cause the generation of such a request. Memory blocks obtained by load accesses are buffered in one or more register files (RFs) 404, and memory blocks updated by store accesses are written to physical storage mapped to the target effective addresses of the memory block from the one or more register files 404.

The operation of each processor core 400 is supported by a multi-level volatile memory hierarchy having at its lowest level a shared system memory 308, and at its upper levels, one or more levels of cache memory, which in the illustrative embodiment include a store-through level one (L1) cache 406 within and private to each processor core 400, a respective store-in level two (L2) cache 410 for each processor core 400. Although the illustrated cache hierarchies include only two levels of cache, those skilled in the art will appreciate that alternative embodiments may include additional levels (L3, etc.) of on-chip or off-chip, private or shared, in-line or lookaside cache, which may be fully inclusive, partially inclusive, or non-inclusive of the contents the upper levels of cache. Operations associated with non-cacheable addresses are serviced by non-cacheable units (NCUs) 412.

Each processing unit 304 also includes an integrated and distributed fabric controller 414 responsible for controlling the flow of operations on system interconnect 306 and for implementing the coherency communication required to implement the selected cache coherency protocol of its SMP 302. Processing unit 304 further includes an integrated I/O (input/output) controller 416 (e.g., a Peripheral Component Interconnect Express (PCIe) controller) supporting the attachment of one or more I/O devices (not depicted), such as non-volatile storage devices, user interface devices, network adapters, etc.

In accordance with a preferred embodiment, each processing unit 304 also includes a co-processor referred to herein as an accelerator switchboard (AS) 420, which, in the depicted embodiment, supports inter-thread push communication. In particular, AS 420 facilitates communication between different software threads executing within the same or different SMPs 302 of data processing environment 300. In addition, AS 420 monitors write operations performed by I/O devices and can notify a software thread that a write operation has occurred. In various implementations, AS 420 can be integrated within the same integrated circuit as other components of SMP 302 (e.g., a processing unit 304), or alternatively, can be integrated into a separate supporting chiplet. Further, the number of AS 420 implemented in any given SMP 302 can be independent of the number of processing units 304 and/or the number of AS 420 implemented in other SMPs 302.

Figure 5:
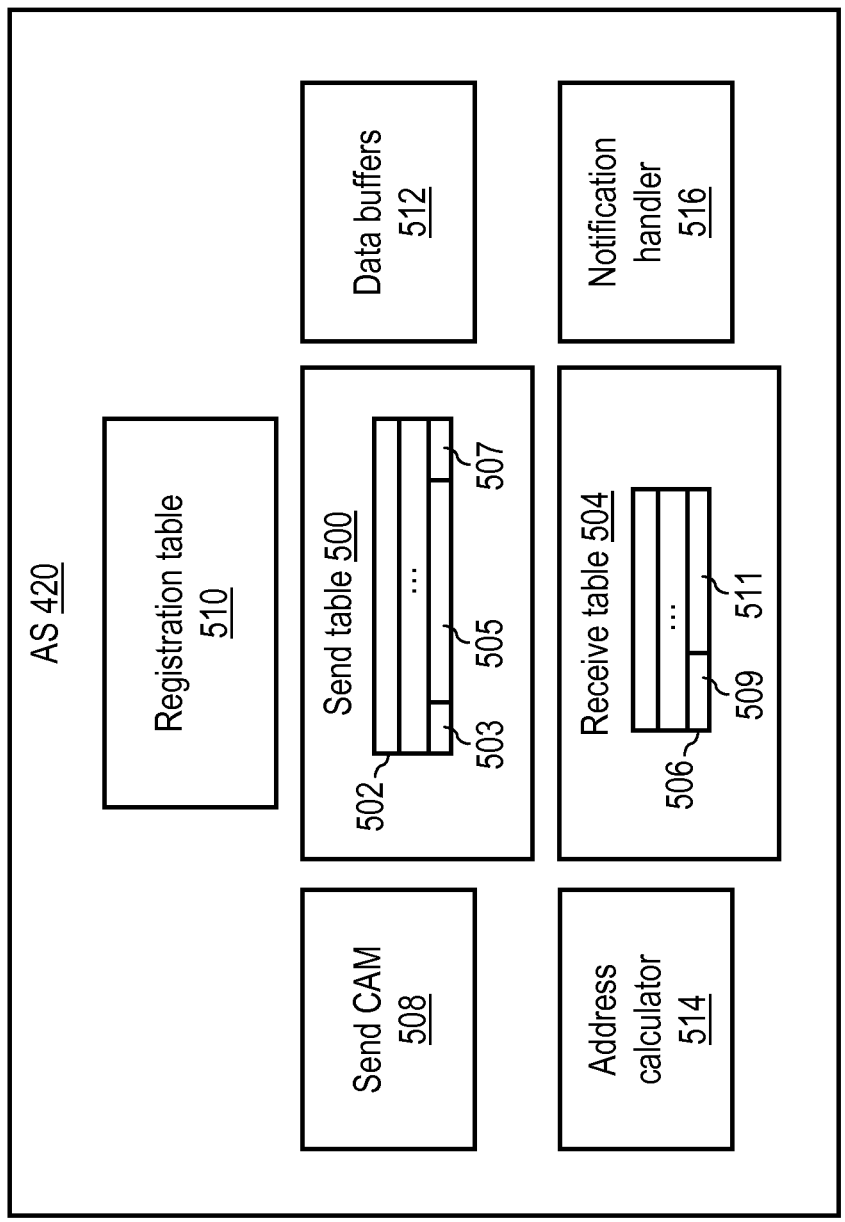
FIG. 5 is more detailed block diagram of an accelerator switchboard (AS) in the exemplary data processing environment of FIG. 3.

With reference now to FIG. 5, there is illustrated a more detailed block diagram of an exemplary embodiment of an AS 420. As shown, AS 420 includes a send table 500 and a receive table 502. Send table 500 includes a number of send table entries 502 (e.g., 128 entries), and receive table 504 includes a number of received table entry 506 (e.g., 128 entries or a lesser or greater number). Each send table entry 504 uniquely corresponds to a send "window" through which at least sending thread can send messages to one or more receiving threads, and each receive table entry 506 uniquely corresponds to a receive "window" through which at least one receiving threads can receive messages from one or more sending threads.

In the illustrated embodiment, each send table entry 502 includes a thread information field 503, which identifies the associated software thread, for example, by process identifier (PID) and logical partition identifier (LPID). In addition, each send table entry 502 includes a receive window field 505 that specifies at least one receive window ID uniquely identifying a particular one of the receive table entries 506 in receive table 504. In preferred embodiments supporting 1-to-N communication, each send table entry 502 supports up to n (e.g., 8) receive window IDs, enabling copies of a message to be sent to up to n mailboxes. As shown, each send table entry 502 may optionally further include an addressing mode field 507 enabling the selection of one of multiple addressing mode for the corresponding send window. The addressing modes of the different send table entries 502 are preferably independently selectable. In various implementations, send table entries 502 may also include additional fields.

In the illustrated embodiment, receive table entries 506 include an addressing information field 509 that provides the information necessary to calculate the address(es) of the mailbox(es) to which a message is to be sent utilizing the chosen addressing mode. In addition, receive table entries 506 include a notification information field 511 that determines what notification, if any, is to be provided to the receiving thread(s) on delivery of the message to the mailbox(es).

AS 420 further includes a send Content-Addressable Memory (CAM) 508 that associates send window IDs with sending threads' identifying information in order to support verification of the validity and authority of message sending requests. A registration table 510 in AS 420 associates connection names (e.g., job IDs) with receive window IDs in order to facilitate registration of threads for inter-thread communication. AS 420 additionally includes a number of data buffers 512 (e.g., 64) for temporarily buffering message requests from software sending threads. In one preferred embodiment, each send table entry 502 can specify a number of "pinned" data buffers 512 that are to be reserved for the corresponding send window. The sum total of all pinned data buffers 512 is preferably limited to being less than the total number of data buffers 512. Any non-pinned data buffers 512 are shared by all send windows that do not have a buffer reservation. Finally, AS 420 includes an address calculator 514 that calculates addresses of mailboxes to which messages are delivered and a notification handler 516 that handles notification of message delivery to receiving threads. Although not specifically separately illustrated, AS 420 includes switch logic configured to perform the functions described herein. Such switching logic can be implemented, for example, in integrated circuitry (including programmable logic) or utilizing a combination of integrated circuitry and software and/or firmware.

Figure 6:
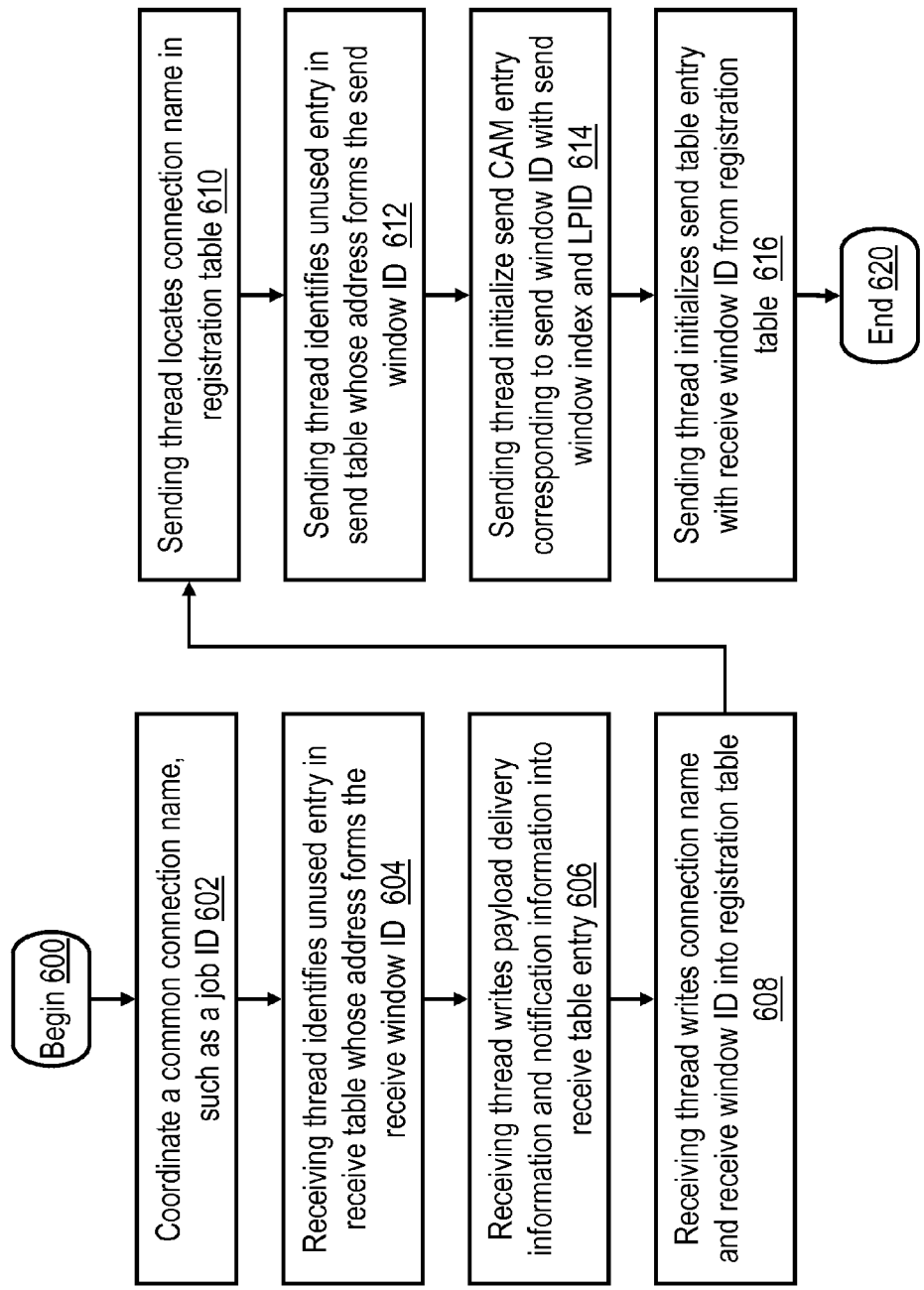
FIG. 6 is a high level logical flowchart of an exemplary process by which threads pre-register with an AS in accordance with one embodiment.

In a preferred embodiments, software threads that employ an AS 420 to communicate pre-register with AS 420 to set up a "connection" between the software threads and to initialize the fields in the relevant entries of send table 502 and receive table 504 that control the behavior of the connection. Referring now to FIG. 6, there is depicted an exemplary method of by which threads pre-register with an AS 420 to facilitate inter-thread push communication in accordance with one embodiment.

The process of FIG. 6 begins at block 600 and then proceeds to block 602, which illustrates coordinating a common connection name, such as a job ID, between each sending thread and receiving thread sharing a connection for 1-to-1, 1-to-N, N-to-1 or N-to-N message communication. At block 604, a receiving thread identifies an unused receive table entry 506 in receive table 504, where the address (e.g., a memory-mapped I/O address) of the identified receive table entry 506 forms the receive window ID. At block 604 the receiving thread writes addressing information for delivery of the payload to the mailbox of the receiving thread and for delivery of the notification to the receiving thread into the identified receive table entry 506 using the receive window ID as the target address. Next, at block 608 the receiving thread completes its registration by writing the connection name and the receive window ID into registration table 510.

At block 610, a sending thread locates the same connection name in registration table 510 of AS 420. In addition, at block 612 the sending thread locates an unused send table entry 502 in send table 500, where the address (e.g., a memory-mapped I/O address) of the identified send table entry 502 forms the send window ID. At block 614 the sending thread initializes an entry of send CAM 508 corresponding to the send window ID with a send window index and a logical partition identifier (LPID) of the sending thread. In addition, at block 616 the sending thread initializes the identified send table entry 502 with the receive window ID associated with the connection name in the registration table. Thereafter, the exemplary registration process of FIG. 6 ends at block 620.

It should be noted that the pre-registration process of FIG. 6 can be employed to enable inter-thread communication both for threads executing within the same SMP and for threads within different SMPs. For cases in which the sending and receiving threads are both executing within the same SMP, the coordination between the sending and receiving threads can be performed utilizing conventional inter-thread communication and/or by platform management software, such as a virtual machine monitor (VMM or hypervisor). In cases in which the sending and receiving threads execute in different directly connected SMPs, the coordination can be handled through hypervisor-to-hypervisor communication, for example, through a dedicated window ID, such as window 0. Thus, in implementations not including a switched network interposed between the sending and receiving threads, the coordination between the sending and receiving threads can be handled without the use or intervention of network management software.

Figure 7:
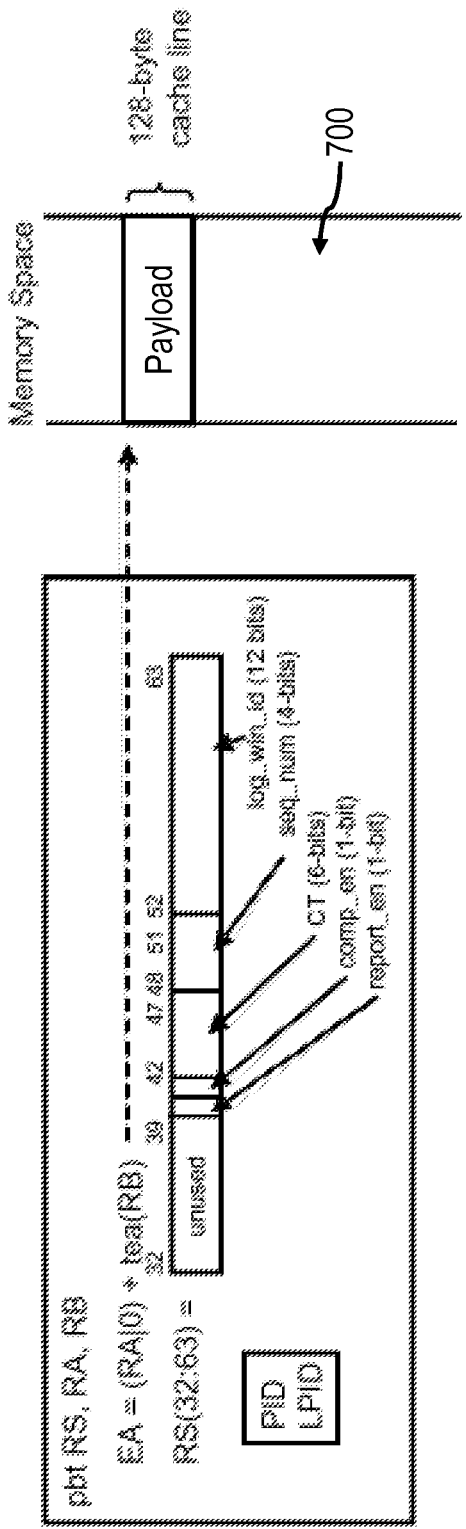
FIG. 7 depicts an exemplary format of a Push Block to Thread (PBT) instruction in accordance with one embodiment.

Referring now to FIG. 7, there is depicted an exemplary form of a PBT instruction in accordance with one embodiment. As noted above, the PBT instruction is executed by a sending thread to push a block to a receiving thread.

In the illustrated example, the PBT instruction takes the form of:

pbt RS, RA, RB, where RS, RA and RB are logical designations of registers in RFs 404. In particular, RA and RB identify source operand registers in RFs 404 whose values are summed (e.g., by LSU 402) to determine the effective address (EA) of a cache line in the virtualized effective address space 700 that is the payload of the message to be transmitted from the sending thread to the receiving thread within data processing environment 300. RS identifies an informational register, which in a preferred embodiment includes the following fields:

Report Enable (report_en): The Report Enable field controls whether a notification or interrupt is sent at the message's final destination. If this message is part of a stream of multiple messages, the Report Enable can be turned off for all messages except for the last one in the stream. The AS will guarantee that the payload of the message with Report Enable active will be delivered after all of the previous messages' payloads.

Completion Enable (comp_en): The Completion Enable field controls whether or not a completion message is returned to the sending thread after a message's payload has been delivered to the destination and the notification or interrupt at the destination is completed (if enabled by Report Enable). A completion message is returned through the send window that has the same ID as the receive window.

Coprocessor Type (CT): The Coprocessor Type field is used by an AS 420 to determine if it should handle this message based on a match between the CT of the AS 420 and the CT of the message.

Sequence Number (seq_num): For non-dot-form PBT instructions, the Sequence Number field contains a software-provided continuously incrementing/wrapping sequence number for each PBT instruction that references the same logical send window ID, thus enabling an AS to insure handling of messages in the proper order. For dot-form PBT instruction, the Sequence Number field is ignored.

Logical Window ID (log_win_id): The Logical Window ID identifies an address in the send CAM of the AS.

As further illustrated in FIG. 7, the PBT instruction is also associated with a particular process identifier (PID) and logical partition identifier (LPID) of the process that is sending the message.

As also alluded to above, a PBT instruction preferably has at least two forms: a dot-form PBT instruction and a non-dot-form PBT instruction. The dot-form of the PBT instruction provides definite closure to the execution of the PBT instruction in that processing of the instruction does not complete until a system response is received that indicates whether the associated message was sent successfully or failed (i.e., experienced an error). For example, in one implementation, the system response can be a coherence message that sets a condition register in processor core 400 to indicate that the transmission of the message succeeded or failed. In at least one embodiment, the dot-form of the PBT instruction relies on management software, such as a virtual machine monitor (hypervisor), to manage virtualization of send and receive windows and to manage exceptions. Further, in at least some implementations, execution of dot-form PBT instructions is strictly ordered, meaning that dot-form PBT instructions in the same thread are executed by a processor core 400 in order and a subsequent dot-form PBT instruction does not begin execution until a previous dot-form PBT instruction, if any, has finished execution.

The non-dot-form of the PBT instruction, by contrast, does not provide definite closure to the execution of the PBT instruction. For example, in some embodiments the processor core executing the non-dot-form PBT instruction does not receive and/or ignores and/or discards confirmation that the corresponding co-processor request has been claimed (accepted) by an AS 420, as provided, for example, by a coherency response on the interconnect fabric 306. An AS 420 can fail to accept a co-processor request directed to it for a number of reasons, including, for example, an internal error, a lack of resources, etc. Thus, the software that contains the sending thread must implement its own error detection and error handling mechanism. Further, because in at least some implementations, processor cores 400 can execute PBT instructions within the same thread in any relative order and overlapping in time, the software that contains the sending thread can employ the Sequence Number fields of the non-dot-form PBT instructions to impose ordering on messages sent using non-dot-form PBT instructions. In at least some embodiments, non-dot-form PBT instructions also are allocated dedicated data buffers 512 in AS 420, thus guaranteeing the availability of this critical resource (assuming that the software that contains the sending thread applies appropriate flow control). Given these characteristics, non-dot-form PBT instructions are suitable for hypervisor or other privileged software that can benefit from the higher performance communication available using non-dot-form PBT instructions (at the cost of more sophisticated error detection, error handling and messaging sequencing code).

Figure 8:
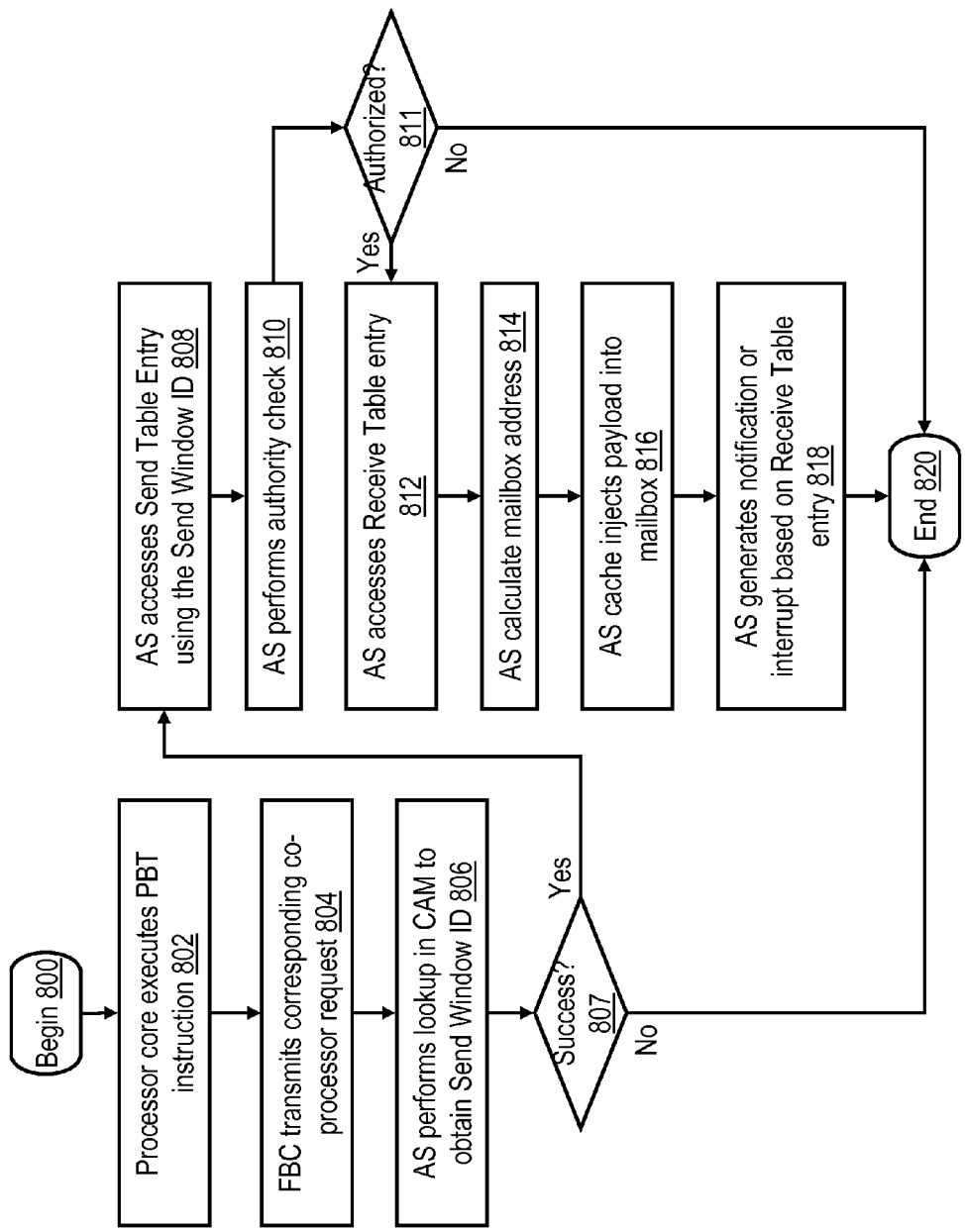
FIG. 8 is a high level logical flowchart of an exemplary process by which a sending thread transmits a message via inter-thread push communication to at least one receiving thread in accordance with one embodiment.

Referring now to FIG. 8, there is depicted an exemplary process by which a sending thread transmits a message via inter-thread push communication to at least one receiving thread in accordance with one embodiment. The illustrated process assumes for ease of description that the sending thread (e.g., a producer thread) and receiving thread (e.g., a consumer thread) execute within the same SMP 302.

The illustrated process begins at block 800 and then proceeds to block 802, which illustrates a sending software thread executing a PBT instruction to send a message containing a data payload (e.g., 128 bytes) to a receiving software thread. In response to execution of the PBT instruction, the executing processor core 400 accesses the payload of the message and communicates to its associated fabric controller 414 the contents of informational register RS, the PID and LPID, and the payload. Fabric controller 414 in turn transmits the contents of information register RS, the PID and LPID and the payload of the message to an AS 420 in the SMP 302 via a co-processor request, which may be transmitted on system interconnect 306 (block 804).

In response to the co-processor request, an AS 420 within the SMP 302 having a CT matching that specified in the co-processor request claims the co-processor request and performs a lookup in send CAM 508 (e.g., utilizing bits from the sending thread's LPID and PID as a CAM key) to determine the relevant send window ID (block 806). As indicated at block 807, if the lookup is successful (i.e., if the sending thread is authorized by CAM 508 to employ inter-thread push communication), the process proceeds to block 808. If the lookup is unsuccessful, the process terminates at block 820, preferably with an error code indicating to the sending thread a lack of authorization. CAM 508 thus provides a hardware-assisted authorization check to provide a first level of verification of the authority of the sending thread to send the message without the use of or reference to a memory management unit (MMU) or similar software-managed data structure on system interconnect 306.

Utilizing the send window ID obtained from CAM 508, AS 420 accesses the corresponding send table entry 502 in send table 500 (block 808) to obtain the receive window ID(s) for the receiving thread(s) and to perform an authority check to verify that the sending thread is authorized to send the message as requested (block 810). In one embodiment, this authority check includes verifying the PID:LPID of the sending thread matches those specified in the thread information field 503 of the send table entry 502. As shown at block 811, if the authorization check fails, the process preferably terminates at block 820, preferably with an error code indicating to the sending thread a lack of authorization.

Assuming the sending thread is authorized to send the message, AS 420 also accesses the receive table entry 506 corresponding to each receive window ID specified in the send table entry 502 (block 812). Utilizing the addressing information contained in each receive table entry 506 identified at block 812, address calculator 514 of AS 420 calculates the destination real address of each mailbox that is to receive the message (block 814) and then issues a respective cache injection request on the system interconnect 306 to inject the message payload into each mailbox that is to receive the message (block 816). In order to provide notification to each receiving thread that it has received a message, AS 420 additionally generates a notification or interrupt to the receiving thread based on the receive table entry 506 indexed by the receive window ID specified in the relevant send table entry 502 of the producer thread (block 818). Thereafter, the process of FIG. 8 ends at block 820.

Figure 9:
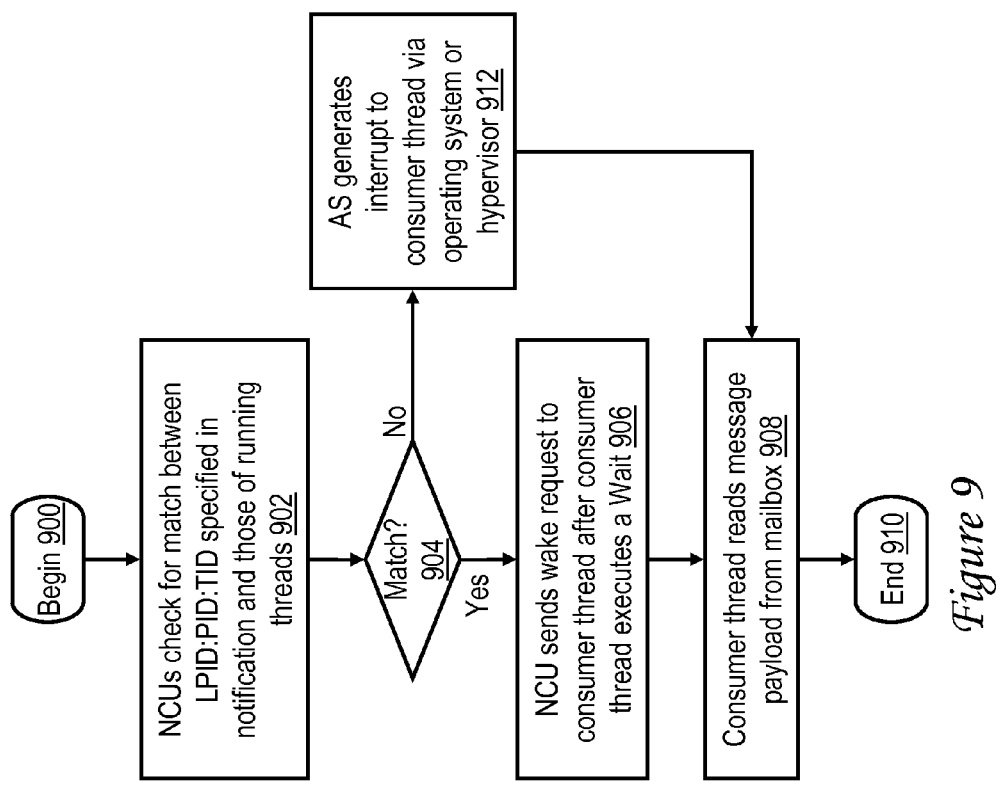
FIG. 9 is a high level logical flowchart of an exemplary process by which one of possibly multiple receiving threads receives a message via inter-thread push communication in accordance with one embodiment.

With reference now to FIG. 9, there is illustrated an exemplary process by which one of possibly multiple receiving threads receives a message via inter-thread push communication in accordance with one embodiment. The illustrated process again assumes for ease of description that the receiving thread (e.g., a consumer thread) executes within the same SMP 302 as the sending thread (e.g., the producer thread). Of course, in some embodiments, the receiving and sending threads may execute within different SMPs 302, as described in further detail below with reference to FIG. 17.

The process of FIG. 9 begins at block 900 in response to receipt by NCUs 412 of a notification of injection of a message into a mailbox by an AS 420, for example, at block 816 of FIG. 8. The process then proceeds to block 902, which illustrates the NCUs 412 checking to determine if the LPID:PID:TID (thread ID) tuple specified in the received notification matches that of one of the threads assigned to the associated processor core 400. In response to a determination at block 904 that an NCU 412 has found a match for the LPID:PID:TID tuple specified in the notification of the AS 420, the NCU 412 that found the match sends a wake request to the appropriate receiving thread to wake the thread from a Wait (suspend) state and cause the thread to resume execution (block 906). It should be noted that, because the receiving thread executes asynchronously with respect to the sending thread, in some cases the receiving thread may enter the Wait state following receipt of the notification by the NCU 412. Upon waking, the consumer thread reads the message payload from its mailbox (block 908). Thereafter, the process ends at block 910.

Returning to block 904, in response to the NCUs 412 of the SMP 302 failing to find a match between the LPID:PID:TID tuple and that of any of the executing software threads, the process passes from block 904 to block 912. Block 912 illustrates AS 420 issuing an interrupt to the consumer thread via management software (e.g., an operating system or hypervisor), for example, by issuing an appropriate command on system interconnect 306. When the interrupt is handled by the interrupt service routine, the interrupt service routine will cause the receiving software thread to be swapped into a hardware thread in the SMP 302. Thereafter, the process proceeds to block 908, which has been described. It should be noted that FIG. 9 may optionally further include the AS 420 providing the sending thread sending confirmation of receipt of the message payload by the receiving thread, if enabled by the PBT instruction.

As noted above, in a preferred embodiment, AS 420 supports multiple different addressing modes for determining the address of the destination of the data payload of a message (e.g., at block 814 of FIG. 8), where the addressing mode for each send window can be selected independently, for example, by appropriately setting the addressing mode field 507 in each send table entry 502. In one embodiment, the supported addressing modes include a First-In, First-Out (FIFO) addressing mode and multiple indexed addressing modes, including a Mailboxes-Favored Indexed (MFI) mode that favors a large number of mailboxes, a Connections-Favored Indexed (CFI) mode that favors a large number of connections between threads, and a Balanced Indexed (BI) mode that supports a reasonably large number of both thread connections and mailboxes.

Figure 10:
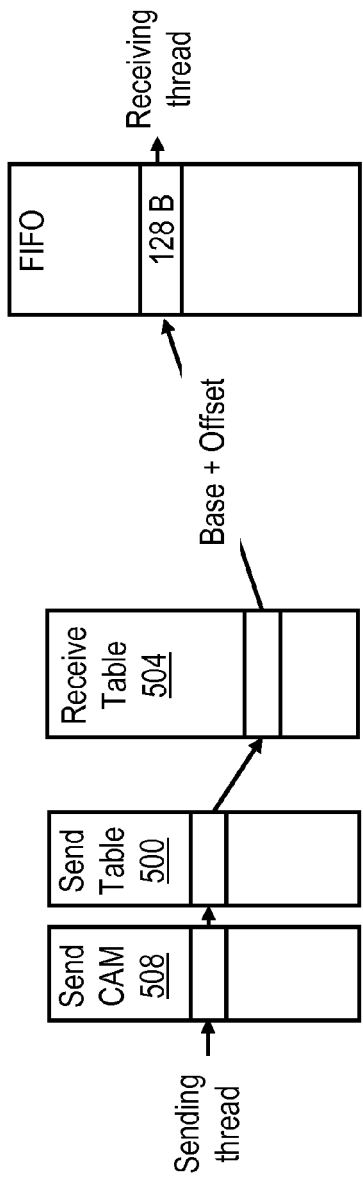
FIG. 10 depicts the data flow employed for 1-to-1 thread communication utilizing a First-In, First-Out (FIFO) addressing mode in accordance with one embodiment.

In the FIFO mode, which supports 1-to-1 communication of messages from a sending thread to a receiving thread, the addressing information 509 contained in the receive table entry 506 indexed by the send table entry 502 includes a base real address that points to the base address of a FIFO mailbox in system memory 308, an offset from the base real address, and, if needed, a size for the FIFO mailbox. In the FIFO mode, address calculator 514 of AS 420 calculates the real address of the destination of the data payload by adding the offset provided by the addressing information 509 to the base real address. After the data payload is injected into the FIFO mailbox, AS 420 increments the offset specified by addressing information 509. This data flow is illustrated in FIG. 10.

In the various indexed addressing modes, the tradeoff between the number of supported connections and the number of mailboxes per thread is a result of the necessarily finite number of bits utilized to specify the destination address of the mailbox into which the data payload of the message will be injected and to form the CAM key utilized to access send CAM 508. In one embodiment, the destination address for the mailbox is determined by combining a mailbox base address (e.g., specified in addressing information field 509 of a receive table entry 506) with bits from fields of the PBT instruction/co-processor request, including the send window ID, PID, and sequence number. By increasing or decreasing the numbers of bits taken from each field in order to form the destination address, different numbers of mailboxes per thread and connections can be supported utilizing a fixed number of address bits. It should also be noted that the different indexed addressing modes also employ different CAM keys formed of different combinations of the sending thread's PID and LPID in order to obtain the desired relationship between sending threads and send windows.

For example, in an embodiment having a 50-bit destination address and 128-byte mailboxes, an address calculation for the MFI mode can be given as:

Dest_Addr=Base_Addr(14:36)∥swinID(0:3)∥PID(12:15)∥swinID(4:11)∥Seq#(0:3)∥0b0000000, where Base_Addr is the base real address, swinID is the send window ID, and Seq# is the sequence number. The MFI mode can employ an 11-bit CAM key formed as follows:

CAM_Key=PID(0:11)∥LPID(0:11)

Using these particular bit combinations, the MFI addressing mode allows specification of 16 sending threads, 16 receiving threads and 4096 mailboxes for each pair of sending and receiving threads, where the sending thread is specified by PID(12:15), the receiving thread is specified by swinID (0:3), and the mailbox is specified by swinID(4:11)∥Seq#(0:3).

Using the same sized destination address and CAM key, in the CFI addressing mode the address calculation can be given as:

Dest_Addr=Base_Addr(14:28)∥swinID(0:11)∥PID(4:15)∥Seq#(0:3)∥0b0000000, and the CAM key can be formed as follows:

CAM_Key=PID(0:3)∥0b00000000∥LPID(0:11)

This implementation of the CFI addressing mode allows specification of 4096 sending threads, 4096 receiving threads and 16 mailboxes for each pair of sending and receiving threads, where the sending thread is specified by PID(4:15), the receiving thread is specified by swinID(0:11), and the mailbox is specified by Seq#(0:3).

Similarly, using the same sized destination address and CAM key, in the BI addressing mode, the address calculation can be given as:

Dest_Addr=Base_Addr(14:32)∥swinID(0:7)∥PID(8:15)∥swinID(8:11)∥Seq#(0:3)∥0b0000000, and the CAM key can be formed as follows:

CAM_Key=PID(0:7)∥0b0000∥LPID(0:11)

This implementation of the BI addressing mode allows specification of 256 sending threads, 256 receiving threads and 256 mailboxes for each pair of sending and receiving threads, where the sending thread is specified by PID(8:15), the receiving thread is specified by swinID(0:7), and the mailbox is specified by swinID(8:11)||Seq#(0:3).

Figure 11:
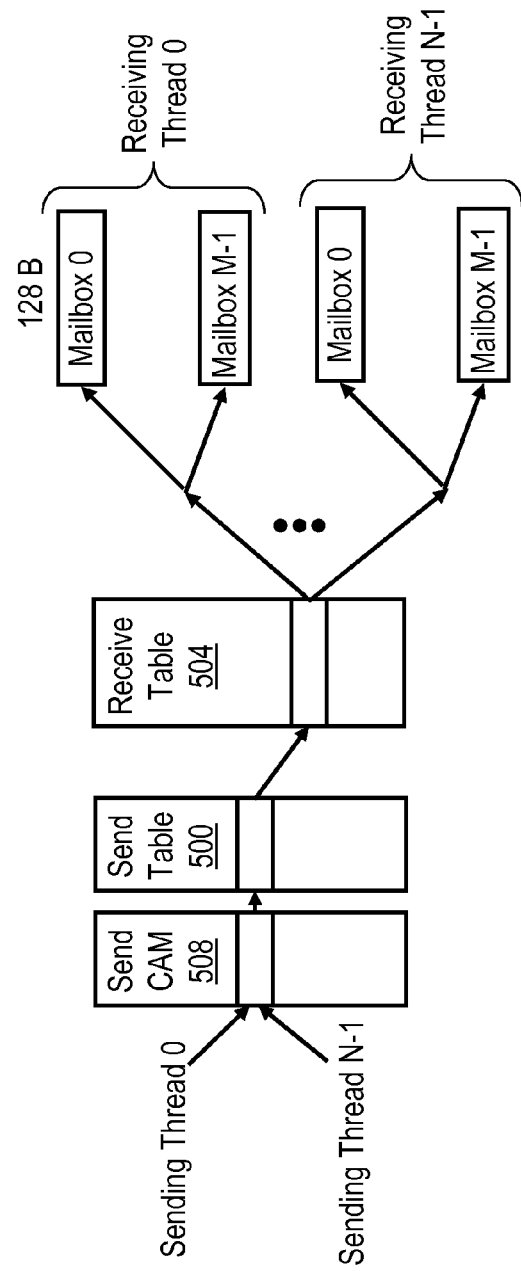
FIG. 11 illustrates the data flow employed in N-to-N thread communication utilizing an indexed addressing mode in accordance with one embodiment.

Those skilled in the art will appreciate that additional indexed addressing modes can be defined and that the numbers of bits utilized to form a destination address of a mailbox and the CAM key are implementation-dependent and will likely vary between embodiments. Further, the particular bit fields utilized to specify sending and receiving threads can be swapped with no change in function. The general data flow employed in the indexed addressing modes is illustrated in FIG. 11.

FIG. 12 illustrates a yet further embodiment in which the available addressing modes further include a hybrid addressing mode that supports both an indexed receive window and a FIFO receive window. In this embodiment, a first value of the 6-bit CT field in the co-processor request generated by execution of the PBT instruction is utilized to select an indexed receive window 506a, and a different second value of the 6-bit CT field is utilized to select a FIFO receive window 506b. Once the desired receive window is selected, the destination address of the mailbox into which the data payload of the message is to be injected is computed as described above for the FIFO addressing mode or one of the indexed addressing modes, as appropriate.

In the foregoing, a detailed description of inter-thread push communication within an SMP is provided. As noted above, the disclosed techniques can also be utilized to implement inter-thread push communication between threads executing within different SMPs. To support the extension of the disclosed techniques to communication between threads executing within different SMPs, routing information can be incorporated within one or more of the send data structures. For example, in the embodiment shown in FIG. 13, each send table entry 502 is augmented to include, in addition to thread information field 503, receive window field 505 and addressing mode field 507, a routing information field 1300 that specifies how messages are to be routed to the receiving thread. As will be appreciated by those skilled in the art, the routing information specified in routing information field 1300 will generally vary in format, depending upon the topology of the data processing environment 300.

Figure 14:
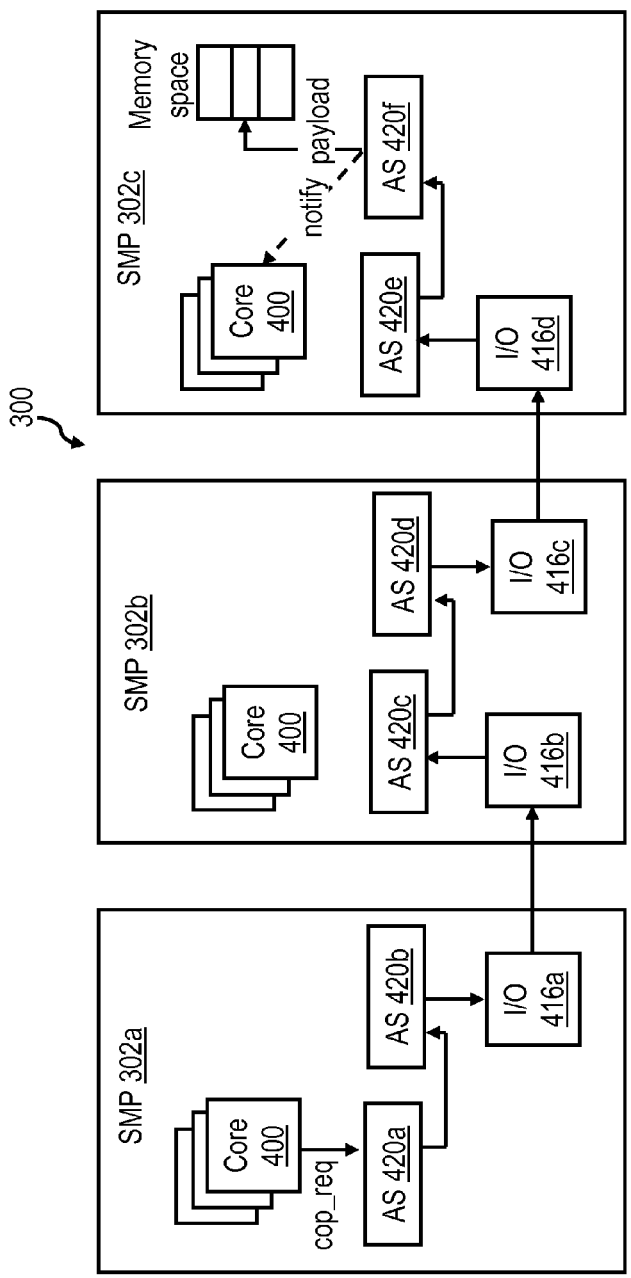
FIG. 14 depicts an exemplary topology of a data processing environment supporting inter-thread push communication between SMPs via direct links.

Consider as an example, the topology of data processing environment 300 given in FIG. 14. In this exemplary topology, SMPs 302a, 302b and 302c are directly connected without any intervening switches through direct cabling between I/O controllers 416, which may be, for example, PCIe controllers. As shown, a sending thread executing in a processor core 400 in SMP 302a is able to inject the data payload of a message into a mailbox assigned to a receiving thread executing on SMP 302c through execution of a PBT instruction, as discussed above. Utilizing the routing information contained in the routing information field 507 of the send table entry 502 of the AS 420a serving the sending thread, the data payload of the message is transmitted from AS 420a to another AS 420b within SMP 302a that is local to an I/O controller 416a having a foreign link to another SMP 302b within the route to the SMP 302c of the receiving thread. The transmission of the message between AS 420a and AS 420b can be made, for example, over system interconnect 306.

In response to receipt of the message, AS 420b processes the route information contained in the message and forwards the message via I/O controller 416a of SMP 302a and I/O controller 416b of SMP 302b to AS 420c of SMP 302b. Based on processing of the routing information contained in the message by AS 420c, AS 420c in turn forwards the message to AS 420d of SMP 302b. This process continues until the message is passed through I/O controller 416c, I/O controller 416d and AS 420e to AS 420f, which serves the receiving thread executing within one of the processor cores 400 of SMP 302c. AS 420f injects the data payload of the message into the destination mailbox, and if indicated by the message, provides a delivery notification to the receiving thread. It should be noted that no involvement of processor cores 400 of any of SMPs 302a-302c is necessary (or desirable) to route the message.

Figure 15:
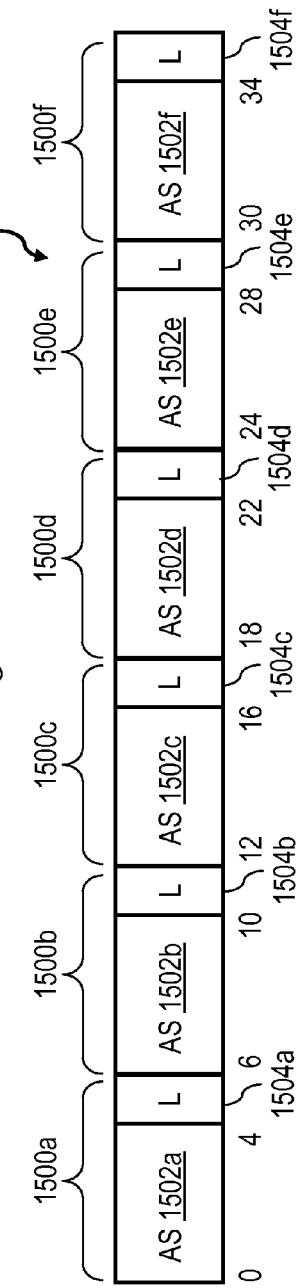
FIG. 15 illustrates an exemplary routing information field of a send table entry supporting the routing of a message from a sending thread to a receiving thread in the topology given in FIG. 14.

With reference now to FIG. 15, there is illustrated an exemplary routing information field 1300 supporting the routing of a message from a sending thread to a receiving thread in a FIFO addressing mode in the exemplary topology of data processing environment given in FIG. 14. This example full source route can be built, for example, by management software (e.g., an operating system or hypervisor) based on topology information learned by the management software at platform startup.

In this example, routing information field 1300 includes six subfields 1500a-1500f each uniquely corresponding to one of the six SMPs 302 along a maximum length route (i.e., a route of 5 "hops"). For example, in the route illustrated in FIG. 14, which includes three SMPs 302a-302c, subfields 1500a-1500c are used, and subfields 1500d-1500f are unused. The first m bits (e.g., 5 bits) of each subfield 1500 form an AS identifier 1502 that uniquely identifies a particular AS 420 in a corresponding SMP 302, and, for each subfield other than the one of the last SMP 302 in the route, the last n bit(s) (e.g., 1 bit) of the subfield indicates through which of the $2^n$ links that can potentially be supported by the specified AS 420 the message is to be transmitted.

In one embodiment, routing information field 1300 is similarly configured for the indexed addressing modes, but, due to use of additional bits for indexing, may include fewer subfields 1500 (e.g., only subfields 1500a and 1500b in an embodiment in which a maximum of one inter-SMP hop is supported).

Figure 16:
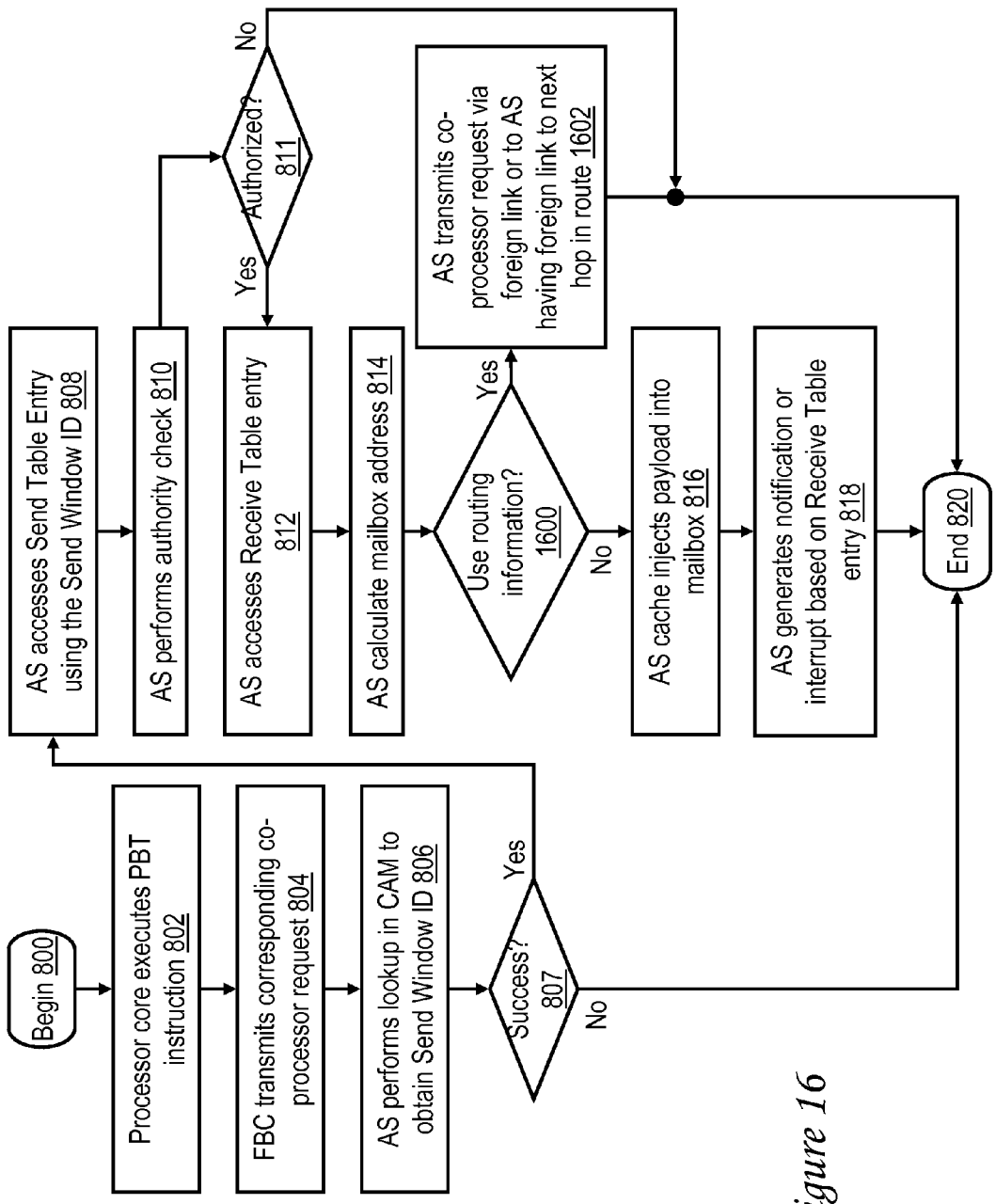
FIG. 16 is a high level logical flowchart of an exemplary process by which a sending thread sends a message via inter-thread push communication in a data processing system environment including multiple SMPs in accordance with one embodiment.

Referring now to FIG. 16, there is depicted an exemplary process by which a sending thread transmits a message via inter-thread push communication to at least one receiving thread in accordance with one embodiment that supports communication between threads executing in different SMPs 302.

As indicated by like reference numerals 800-814, the process of FIG. 16 can employ many of the same steps as depicted in FIG. 8, which are accordingly not described again here.

The process of FIG. 16 further determines at block 1600 whether or not the routing information field 1300 of the relevant send table entry 502 is to be used. This determination can be made, for example, by reference to the state of an associated "Send Local" bit in the send table entry 502. If the routing information field 1300 of the relevant send table entry 502 is not to be used, the process proceeds to block 816, 818 and 820, which have been described. If, however, the AS 420 serving the sending thread determines at block 1600 that the routing information field 1300 is to be used, the process of FIG. 16 passes to block 1602. Block 1602 illustrates the AS 420 serving the sending thread utilizing the routing information contained in routing information field 1300 to transmit the co-processor request via a foreign link (e.g., of the I/O controller 416 in the same processing unit 304) to the next hop SMP 302 or to an AS 420 in the same SMP 302 having a foreign link to the next hop SMP 302 based on the known topology of the clustered SMPs 302. Thereafter, the process of FIG. 16 ends at block 820.

Figure 17:
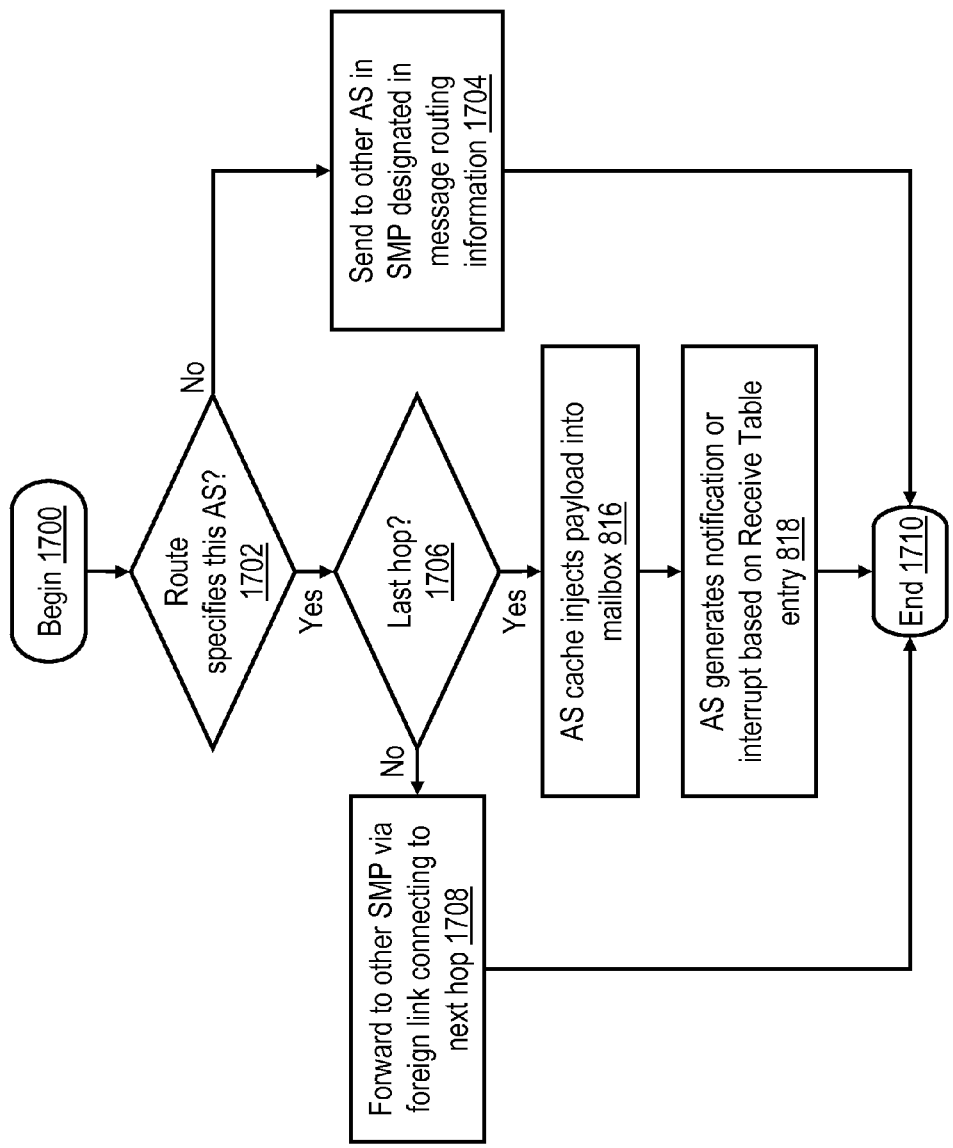
FIG. 17 is a high level logical flowchart of an exemplary process by which an AS routes a message in accordance with one embodiment.

With reference now to FIG. 17, there is illustrated a high level logical flowchart of an exemplary process by which an AS 420 in an SMP 302 other than that in which a co-processor request originates processes a co-processor request in accordance with one embodiment. The process begins at block 1700 in response to receipt by an AS 420 other than the one serving the sending thread receiving the co-processor request transmitted at block 1602 of FIG. 16. At block 1702, the AS 420 determines whether the routing information contained in the co-processor request specifies the AS 420. If not, the process proceeds from block 1702 to block 1704, which illustrates the AS 420 forwarding the co-processor request to another AS 420 in the same SMP 302 that is designated in the routing information in the co-processor request. Thereafter, the process of FIG. 17 ends at block 1710.

Returning to block 1702, if the AS 420 determines that the routing information of the co-processor request specifies the AS 420, the AS 420 also determines whether or not the AS 420 is the last hop of the route (block 1706). In response to a determination at block 1706 that the AS 420 is not the last hop of the route of the co-processor request, the AS 420 forwards the co-processor request to another SMP 302 via the foreign link specified in the routing information, which connects to the next hop of the route. Thereafter, the process of FIG. 17 ends at block 1710.

Referring again to block 1706, in response to a determination that the AS 420 is the last hop of the route, the process of FIG. 17 proceeds to block 816 and 818, which, as described above, depicts the AS 420 issuing a cache injection request on the system interconnect 306 to inject the message payload into each mailbox that is to receive the message (block 816) and generating a notification or interrupt to the receiving thread based on the receive table entry 506 indexed by the receive window ID identified in the co-processor request (block 818). Thereafter, the process of FIG. 17 ends at block 1710.

Figure 18:
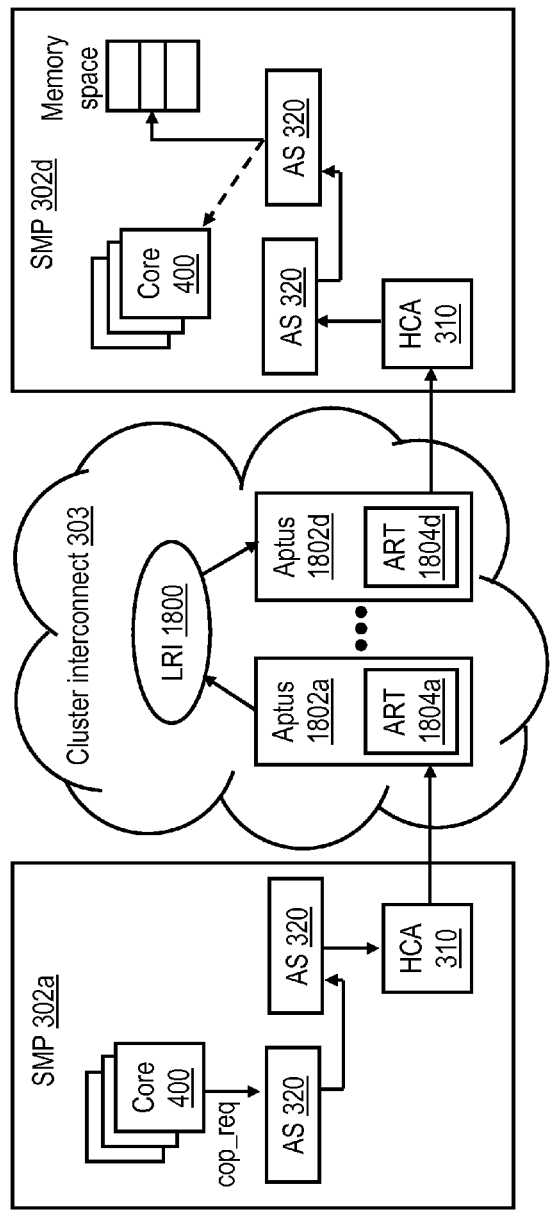
FIG. 18 depicts an exemplary topology of a data processing environment supporting inter-thread push communication between SMPs via an intervening switched network.

Consider now the alternative topology of data processing environment 300 given in FIG. 18. In this exemplary topology, SMPs 302a and 302d are connected through an implementation of cluster interconnect 303 including a switched network, such as an Aptus network as described, for example, in Koop, M. J.; Jones, T.; Panda, D. K., "MVAPICH-Aptus: Scalable high-performance multi-transport MPI over InfiniBand," *Parallel and Distributed Processing*, 2008. *IPDPS* 2008. *IEEE International Symposium on*, vol., no., pp. 1, 12, 14-18 Apr. 2008, which is incorporated herein by reference. In the depicted implementation, the Aptus network includes a local rack interconnect (LRI) 1800 to which a number of Aptus chips 1802a-1802d are connected. Each Aptus chip supports an Infiniband connection with a HCA 310 of a respective SMP 302, enabling direct communication via the Aptus network between any pair of SMPs 302 connected via LRI 1800. Each Aptus chip 1802 includes a respective Aptus route table (ART) 1804 by which that Aptus chip 1802 routes messages to other Aptus chips 1802. The contents of Aptus tables 1804 can be established, for example, by management software (e.g., an operating system or hypervisor of one or more SMPs 302) based on the network topology discovered, for example, at platform startup.

Figure 19:
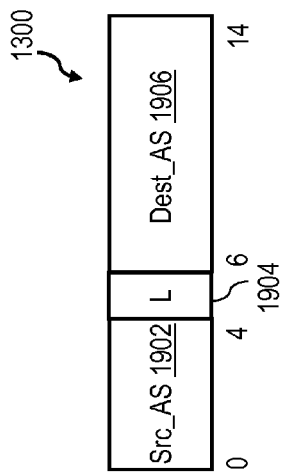
FIG. 19 illustrates an exemplary routing information field of a send table entry supporting the routing of a message from a sending thread to a receiving thread in the topology given in FIG. 18.

With reference now to FIG. 19, there is illustrated an exemplary embodiment of routing information field 1300 of a send table entry 502 for the topology of data processing environment illustrated in FIG. 18. In this embodiment, there is at most one SMP hop on either side of the Aptus network (or other switched network). Accordingly, routing information field 1300 includes a source AS identifier 1902 (e.g., a 5-bit identifier) that uniquely identifies a particular AS 420 in the source SMP 302 that is executing the sending thread, and an n bit(s) (e.g., 1 bit) link subfield 1904 that indicates through which of the $2^n$ links that can potentially be supported by the source AS 420 the message is to be transmitted to the Aptus network. In addition, routing information field 1300 further includes a destination AS identifier 1906 (e.g., a 9-bit identifier) that serves a key that indexes into an entry in the ART 1804 of the Aptus chip 1802 to which the source SMP 302 is connected. The indexed entry includes a destination Aptus value that identifies a destination Aptus chip 1802 and an exit route. The exit route is passed to the ingress AS 420 that receives the co-processor request message from the Aptus network. In one example in which the exit route is a 9-bit value, the ingress AS 420 uses the first five bits of the exit route to make at most one AS-to-AS hop within the destination SMP 302. If the first five bits of the exit route are a reserved value, such as 0b11111, then the ingress AS 420 is itself the end of the route and injects the message payload into mailbox of the receiving thread and generates a notification or interrupt, if required.

Figure 20:
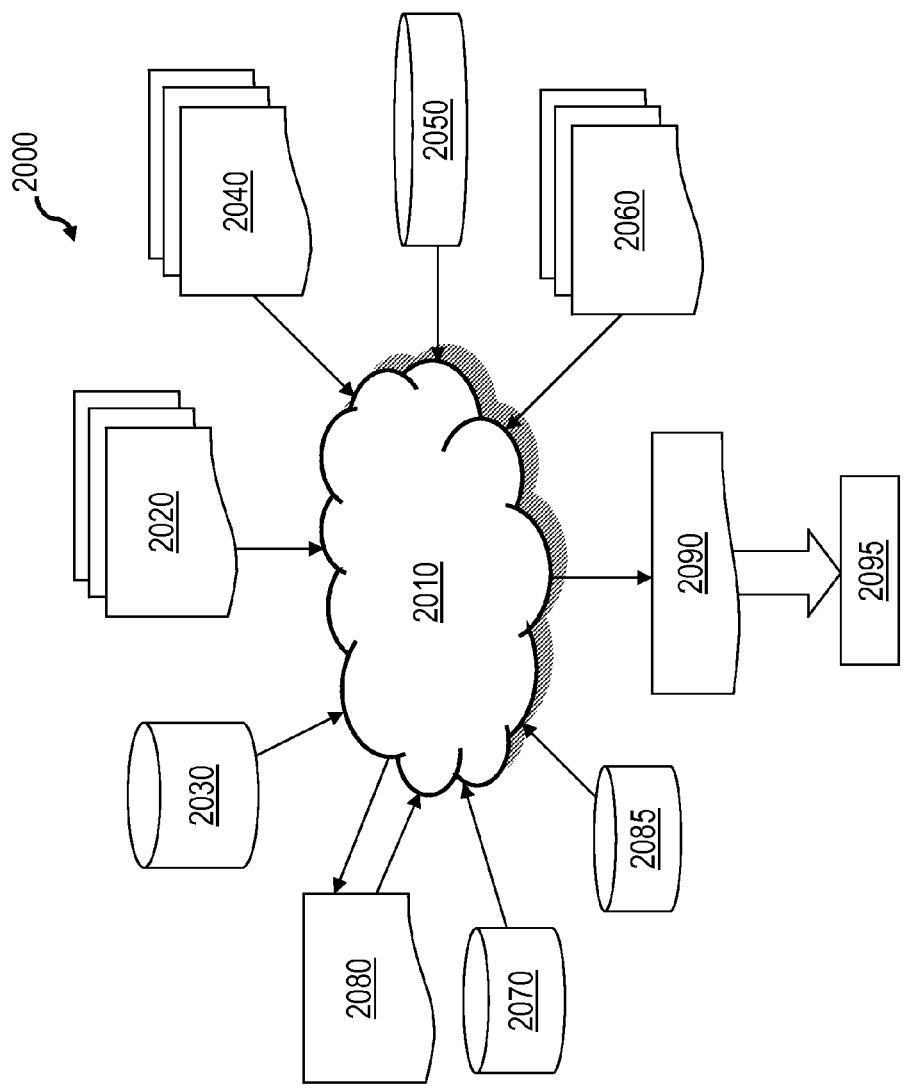
FIG. 20 is a data flow diagram illustrating a design process.

With reference now to FIG. 20, there is depicted a block diagram of an exemplary design flow 2000 used for example, in semiconductor IC logic design, simulation, test, layout, and manufacture. Design flow 2000 includes processes, machines and/or mechanisms for processing design structures or devices to generate logically or otherwise functionally equivalent representations of the design structures and/or devices described above and shown herein. The design structures processed and/or generated by design flow 2000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 2000 may vary depending on the type of representation being designed. For example, a design flow 2000 for building an application specific IC (ASIC) may differ from a design flow 2000 for designing a standard component or from a design flow 2000 for instantiating the design into a programmable array, for example a programmable gate array (PGA) or a field programmable gate array (FPGA) offered by Altera® Inc. or Xilinx® Inc.

FIG. 20 illustrates multiple such design structures including an input design structure 1020 that is preferably processed by a design process 2010. Design structure 2020 may be a logical simulation design structure generated and processed by design process 2010 to produce a logically equivalent functional representation of a hardware device. Design structure 2020 may also or alternatively comprise data and/or program instructions that when processed by design process 2010, generate a functional representation of the physical structure of a hardware device. Whether representing functional and/or structural design features, design structure 2020 may be generated using electronic computer-aided design (ECAD) such as implemented by a core developer/designer. When encoded on a machine-readable data transmission, gate array, or storage medium, design structure 2020 may be accessed and processed by one or more hardware and/or software modules within design process 2010 to simulate or otherwise functionally represent an electronic component, circuit, electronic or logic module, apparatus, device, or system such as those shown herein. As such, design structure 2020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 2010 preferably employs and incorporates hardware and/or software modules for synthesizing, translating, or otherwise processing a design/simulation functional equivalent of the components, circuits, devices, or logic structures shown herein to generate a netlist 2080 which may contain design structures such as design structure 2020. Netlist 2080 may comprise, for example, compiled or otherwise processed data structures representing a list of wires, discrete components, logic gates, control circuits, I/O devices, models, etc. that describes the connections to other elements and circuits in an integrated circuit design. Netlist 2080 may be synthesized using an iterative process in which netlist 2080 is resynthesized one or more times depending on design specifications and parameters for the device. As with other design structure types described herein, netlist 2080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 2010 may include hardware and software modules for processing a variety of input data structure types including netlist 2080. Such data structure types may reside, for example, within library elements 2030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 2040, characterization data 2050, verification data 2060, design rules 2070, and test data files 2085 which may include input test patterns, output test results, and other testing information. Design process 2010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 2010 without deviating from the scope and spirit of the invention. Design process 2010 may also include modules for performing standard circuit design processes such as timing analysis, verification, design rule checking, place and route operations, etc.

Design process 2010 employs and incorporates logic and physical design tools such as HDL compilers and simulation model build tools to process design structure 2020 together with some or all of the depicted supporting data structures along with any additional mechanical design or data (if applicable), to generate a second design structure 2090. Design structure 2090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 2020, design structure 2090 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 2090 may comprise a compiled, executable HDL simulation model that functionally simulates the devices shown herein.

Design structure 2090 may also employ a data format used for the exchange of layout data of integrated circuits and/or symbolic data format (e.g., information stored in a GDSII (GDS2), GLI, OASIS, map files, or any other suitable format for storing such design data structures). Design structure 2090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 2090 may then proceed to a stage 2095 where, for example, design structure 2090: proceeds to tape-out, is released to manufacturing, is released to a mask house, is sent to another design house, is sent back to the customer, etc.

As has been described, in at least some embodiments, a processor core of a data processing system receives a push instruction of a sending thread that requests that a message payload identified by at least one operand of the push instruction be pushed to a mailbox of a receiving thread. In response to receiving the push instruction, the processor core executes the push instruction of the sending thread. In response to executing the push instruction, the processor core initiates transmission of the message payload to the mailbox of the receiving thread. In one embodiment, the processor core initiates transmission of the message payload by transmitting a co-processor request to a switch of the data processing system via an interconnect fabric.

In at least some embodiments, a processor core executes a sending thread including a first push instruction and a second push instruction subsequent to the first push instruction in a program order. Each of the first and second push instructions requests that a respective message payload be pushed to a mailbox of a receiving thread. In response to executing the first and second push instructions, the processor core transmits respective first and second co-processor requests to a switch in the data processing system via an interconnect fabric of the data processing system. The processor core transmits the second co-processor request to the switch without regard to acceptance of the first co-processor request by the switch.

In at least some embodiments, a switch of a data processing system receives a request to push a message referenced by an instruction of a sending thread to a receiving thread. In response to receiving the request, the switch determines whether the sending thread is authorized to push the message to the receiving thread by attempting to access an entry of a data structure of the switch utilizing a key derived from at least one identifier of the sending thread. In response to access to the entry being successful, content of the entry is utilized to determine an address of a mailbox of the receiving thread, and the switch pushes the message to the mailbox of the receiving thread. In response to access to the entry not being successful, the switch refrains from pushing the message to the mailbox of the receiving thread.

In at least some embodiments, a switch includes a receive data structure including receive entries each uniquely corresponding to a receive window, where each receive entry includes addressing information for one or more mailboxes into which messages can be injected, a send data structure including send entries each uniquely corresponding to a send window, where each send entry includes a receive window field that identifies one or more receive windows, and switch logic. The switch logic, responsive to a request to push a message to one or more receiving threads, accesses a send entry that corresponds to a send window of the sending thread, utilizes contents of the receive window field of the send entry to access one or more of the receive entries, and pushes the message to one or more mailboxes of one or more receiving threads utilizing the addressing information of the receive entry or entries.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GLI, OASIS, map files, or any other suitable format for storing such design data structures).

What is claimed is:

1. A processing unit for a data processing system including a co-processor including a switch, the processing unit comprising:
a memory; and
a processor core coupled to the memory, wherein the processor core includes at least one execution unit that executes, in a sending thread, a first push instruction and a second push instruction subsequent to the first push instruction in a program order, wherein each of the first and second push instructions requests that a respective message payload be pushed to a mailbox of a receiving thread;
wherein the processor core, in response to executing the first and second push instructions, invokes calculation, by the switch, of an address of the mailbox and injection, by the switch, of the respective message payloads of the first and second push instructions into the mailbox, wherein the processor core invokes calculation of the address of the mailbox and injection of the message payloads into the mailbox by transmitting, to the switch, respective first and second co-processor requests to the switch via an interconnect fabric of the data processing system, wherein the processor core transmits the second co-processor request to the switch without regard to acceptance of the first co-processor request by the switch.

2. The processing unit of claim 1, wherein the processor core executes the first and second push instructions without regard to the program order.

3. The processing unit of claim 1, wherein the processor core transmits, in each of the first and second co-processor requests, a software-supplied sequence number that orders the respective message payloads of the first and second push instructions.

4. The processing unit of claim 1, wherein:
the data processing system includes multiple switches including the switch;
the first push instruction includes a co-processor type parameter that identifies the switch as responsible for servicing the first co-processor request; and
the processor core transmits, with the first co-processor request, the co-processor type parameter.

5. The processing unit of claim 1, wherein:
the switch includes a data structure including a plurality of entries;
the push instruction includes a logical window parameter that identifies a particular entry among the plurality of entries in the data structure in the switch that is to be used to transmit the message payload of the first push instruction; and
the processor core transmits, with the first co-processor request, the logical window parameter.

6. The processing unit of claim 1, wherein:
the push instruction includes a report enable parameter; and
the processor core, responsive to the report enable parameter having an enabled state, transmits, with the first co-processor request, the report enable parameter to request notification of the receiving thread of injection of the message payload of the first push instruction into the mailbox of the receiving thread.

7. The processing unit of claim 1, wherein:
the push instruction includes a completion enable parameter; and
the processor core, responsive to the completion enable parameter having an enabled state, transmits, with the first co-processor request, the completion enable parameter to request that the switch provide notification to the sending thread of injection of the message payload of the first push instruction into the mailbox of the receiving thread.

8. A data processing system including a switch, the data processing system comprising:
a memory;
an interconnect fabric;
a processor core coupled to the memory and to the interconnect fabric, wherein the processor core includes at least one execution unit that executes, in a sending thread, a first push instruction and a second push instruction subsequent to the first push instruction in a program order, wherein each of the first and second push instructions requests that a respective message payload be pushed to a mailbox of a receiving thread, and wherein the processor core, in response to executing the first and second push instructions, invokes calculation, by the switch, of an address of the mailbox and injection, by the switch, of the respective message payloads of the first and second push instructions into the mailbox, wherein the processor core invokes calculation of the address of the mailbox and injection of the message payloads into the mailbox by transmitting, to the switch, respective first and second co-processor requests via the interconnect fabric; and
a co-processor coupled to the interconnect fabric, wherein the co-processor includes the switch, and wherein the switch, responsive to acceptance of the first co-processor request, calculates the address of the mailbox and injects the respective message payload of the first co-processor request into the mailbox of the receiving thread, and, responsive to acceptance of the second co-processor request, injects the respective message payload of the second co-processor request into the mailbox of the receiving thread, wherein the processor core transmits the second co-processor request to the switch without regard to acceptance of the first co-processor request by the switch.

9. The data processing system of claim 8, wherein the processor core executes the first and second push instructions without regard to the program order.

10. The data processing system of claim 8, wherein the processor core transmits, in each of the first and second co-processor requests, a software-supplied sequence number that orders the respective message payloads of the first and second push instructions.

11. The data processing system of claim 8, wherein:
the data processing system includes multiple switches including the switch;
the first push instruction includes a co-processor type parameter that identifies the switch as responsible for servicing the first co-processor request; and
the processor core transmits, with the first co-processor request, the co-processor type parameter.

12. The data processing system of claim 8, wherein:
the switch includes a data structure including a plurality of entries;
the push instruction includes a logical window parameter that identifies a particular entry among the plurality of entries in the data structure in the switch that is to be used to transmit the message payload of the first push instruction; and
the processor core transmits, with the first co-processor request, the logical window parameter.

13. The data processing system of claim 8, wherein:
the push instruction includes a report enable parameter; and
the processor core, responsive to the report enable parameter having an enabled state, transmits, with the first co-processor request, the report enable parameter to request notification of the receiving thread of injection of the message payload of the first push instruction into the mailbox of the receiving thread.

14. The data processing system of claim 8, wherein:
the push instruction includes a completion enable parameter; and
the processor core, responsive to the completion enable parameter having an enabled state, transmits, with the first co-processor request, the completion enable parameter to request that the switch provide notification to the sending thread of injection of the message payload of the first push instruction into the mailbox of the receiving thread.

* * * * *